(12) United States Patent
Gurumohan et al.

(10) Patent No.: US 11,274,955 B2
(45) Date of Patent: Mar. 15, 2022

(54) FOULING MITIGATION AND MEASURING VESSEL WITH CONTAINER FILL SENSOR

(71) Applicant: Nectar, Inc., Palo Alto, CA (US)

(72) Inventors: Prabhanjan C. Gurumohan, Mountain View, CA (US); Samuel Bae, San Jose, CA (US); Nicholas Fraser, Union City, CA (US); Krishna Gadiyaram, Sunnyvale, CA (US); Aayush Phumbhra, Palo Alto, CA (US)

(73) Assignee: Nectar, Inc., Palo Alto, CA (US)

( * ) Notice: Subject to any disclaimer, the term of this patent is extended or adjusted under 35 U.S.C. 154(b) by 193 days.

(21) Appl. No.: 16/438,302

(22) Filed: Jun. 11, 2019

(65) Prior Publication Data

US 2020/0003602 A1 Jan. 2, 2020

Related U.S. Application Data

(60) Provisional application No. 62/778,805, filed on Dec. 12, 2018, provisional application No. 62/683,834, filed on Jun. 12, 2018.

(51) Int. Cl.
*G01F 23/28* (2006.01)
*G01F 23/296* (2006.01)
(Continued)

(52) U.S. Cl.
CPC ............ *G01F 23/248* (2013.01); *G01F 23/26* (2013.01); *G01F 23/28* (2013.01); *G01F 23/284* (2013.01);
(Continued)

(58) Field of Classification Search
CPC .... G01F 23/28; G01F 23/296; G01F 23/2962; G01F 23/284
See application file for complete search history.

(56) References Cited

U.S. PATENT DOCUMENTS 2,804,103 A 8/1957 Wall
4,386,409 A 5/1983 Petroff
(Continued)

FOREIGN PATENT DOCUMENTS

| CN | 101726343 | 6/2010 |
|---|---|---|
| CN | 103815675 | 5/2014 |
| WO | 2016037612 | 3/2016 |

OTHER PUBLICATIONS

Amanda Macmillan. It's the Water Bottle of the Future—and You can Pre-Order It Now! Fitness (Flash/Fitness-Blog/) Oct. 7, 2013. http://www.self.com/flash/fitness-blog/2013/10/fitness-water-bottle-of-the-future/.

(Continued)

*Primary Examiner* — Paul M. West
(74) *Attorney, Agent, or Firm* — Dana Legal Services; Jubin Dana

(57) ABSTRACT

A sensor device includes a signal transmitting component configured to transmit a signal into a container engaged by the sensor device, wherein a frequency of the signal is selected to allow the signal to at least in part pass through a content fouling at least a portion of the signal transmitting component. The sensor device includes a processor configured to process a received reflected version of the transmitted signal to determine an identifier associated with an amount of content in the container engaged by the sensor device. The sensor device includes a wireless transmitter configured to transmit the identifier associated with the amount of content in the container.

21 Claims, 19 Drawing Sheets

(51) Int. Cl.
  *G01F 23/284* (2006.01)
  *G01F 23/24* (2006.01)
  *G01F 23/26* (2022.01)
  *G01F 23/2962* (2022.01)

(52) U.S. Cl.
  CPC ........ *G01F 23/296* (2013.01); *G01F 23/2962* (2013.01)

(56) References Cited

U.S. PATENT DOCUMENTS

| | | |
|---|---|---|
| 4,697,200 A | 9/1987 | Miyatake |
| 4,698,541 A | 10/1987 | Bar-Cohen |
| 4,723,305 A | 2/1988 | Phillips |
| 4,782,451 A | 11/1988 | Mazzarella |
| 4,823,600 A | 4/1989 | Biegel |
| 4,934,191 A | 6/1990 | Kroening |
| 4,961,456 A | 10/1990 | Stembridge |
| 5,042,698 A | 8/1991 | Fessell |
| 5,085,077 A | 2/1992 | Stapleton |
| 5,150,334 A | 9/1992 | Crosby |
| 5,303,585 A | 4/1994 | Lichte |
| 5,389,848 A | 2/1995 | Trzaskos |
| 5,471,872 A | 12/1995 | Cummings |
| 5,603,430 A | 2/1997 | Loehrke |
| 5,793,705 A | 8/1998 | Gazis |
| 5,866,815 A | 2/1999 | Schwald |
| 5,880,364 A | 3/1999 | Dam |
| 6,272,921 B1 | 8/2001 | Ivanovich |
| 6,545,946 B1 | 4/2003 | Huss |
| 6,856,247 B1 | 2/2005 | Wallace |
| 7,068,805 B2 | 6/2006 | Geddes |
| 7,088,258 B2 | 8/2006 | Morrison |
| 7,109,863 B2 | 9/2006 | Morrison |
| 7,190,278 B2 | 3/2007 | Morrison |
| 7,495,558 B2 | 2/2009 | Pope |
| 7,573,395 B2 | 8/2009 | Morrison |
| 7,598,883 B2 | 10/2009 | Morrison |
| 8,061,198 B2 | 11/2011 | Yinko |
| 8,151,596 B2 | 4/2012 | Richmond |
| 8,284,068 B2 | 10/2012 | Johnson |
| 8,453,878 B2 | 6/2013 | Palmquist |
| 8,851,740 B1 | 10/2014 | Mills |
| 8,981,793 B2 | 3/2015 | Mukherjee |
| 9,506,798 B2 | 11/2016 | Saltzgiver |
| 9,508,484 B2 | 11/2016 | Scholz |
| 9,576,267 B2 | 2/2017 | Kundra |
| 9,911,290 B1 | 3/2018 | Zalewski |
| 9,927,281 B1 * | 3/2018 | Anand ............... G01F 23/284 |
| 10,078,003 B2 | 9/2018 | Gurumohan |
| 10,127,520 B2 | 11/2018 | Kundra |
| 10,161,782 B2 | 12/2018 | Saltzgiver |
| 10,219,641 B2 | 3/2019 | Liao |
| 10,267,667 B2 | 4/2019 | Gurumohan |
| 10,324,075 B2 | 6/2019 | Gurumohan |
| 10,670,444 B2 | 6/2020 | Gurumohan |
| 10,800,644 B2 * | 10/2020 | Hikem ............... D06F 39/02 |
| 2002/0059828 A1 | 5/2002 | Muller |
| 2002/0070861 A1 | 6/2002 | Teller |
| 2003/0037613 A1 | 2/2003 | Mulrooney |
| 2004/0169600 A1 | 9/2004 | Haynes |
| 2005/0033532 A1 | 2/2005 | Mogadam |
| 2005/0072226 A1 | 4/2005 | Pappas |
| 2005/0087255 A1 | 4/2005 | Humphrey |
| 2005/0090743 A1 | 4/2005 | Kawashima |
| 2005/0268715 A1 | 12/2005 | Sabatino |
| 2006/0154642 A1 | 7/2006 | Scannell |
| 2006/0201245 A1 | 9/2006 | Huber |
| 2006/0231109 A1 | 10/2006 | Howell |
| 2006/0270421 A1 | 11/2006 | Phillips |
| 2007/0008212 A1 | 1/2007 | Serban |
| 2007/0125162 A1 | 6/2007 | Ghazi |
| 2007/0191983 A1 | 8/2007 | Griffits |
| 2007/0261487 A1 | 11/2007 | Sintes |
| 2008/0004957 A1 | 1/2008 | Hildreth |
| 2008/0036615 A1 | 2/2008 | Lyall, III |
| 2008/0147211 A1 | 6/2008 | Teller |
| 2008/0154522 A1 | 6/2008 | Welle |
| 2008/0250869 A1 | 10/2008 | Breed |
| 2008/0297403 A1 | 12/2008 | Akerstrom |
| 2008/0314807 A1 | 12/2008 | Junghanns |
| 2009/0093983 A1 | 4/2009 | Trafford |
| 2009/0105969 A1 | 4/2009 | Saylor |
| 2009/0134183 A1 | 5/2009 | Odishoo |
| 2009/0289835 A1 | 11/2009 | Edvardsson |
| 2010/0070208 A1 | 3/2010 | Sai |
| 2010/0101317 A1 | 4/2010 | Ashrafzadeh |
| 2010/0108635 A1 | 5/2010 | Horstman |
| 2010/0200593 A1 | 8/2010 | Lazar |
| 2010/0270257 A1 | 10/2010 | Wachman |
| 2011/0042408 A1 | 2/2011 | Giordano |
| 2011/0166699 A1 | 7/2011 | Palmquist |
| 2011/0169635 A1 | 7/2011 | Johnson |
| 2012/0052802 A1 | 3/2012 | Kasslin |
| 2012/0206155 A1 | 8/2012 | Wang |
| 2013/0002443 A1 | 1/2013 | Breed |
| 2013/0073218 A1 | 3/2013 | Haas |
| 2013/0122817 A1 | 5/2013 | Pivaudran |
| 2013/0222135 A1 | 8/2013 | Stein |
| 2013/0313204 A1 | 11/2013 | Shalon |
| 2014/0149265 A1 | 5/2014 | Kundra |
| 2014/0208845 A1 | 7/2014 | Zlotnick |
| 2014/0251850 A1 | 9/2014 | Huang |
| 2014/0324585 A1 | 10/2014 | Mederos |
| 2014/0360270 A1 | 12/2014 | Koenig |
| 2015/0101405 A1 | 4/2015 | Gorenflo |
| 2015/0285775 A1 | 10/2015 | Gurumohan |
| 2015/0334079 A1 | 11/2015 | Laidlaw |
| 2015/0355012 A1 | 12/2015 | Gurumohan et al. |
| 2016/0025545 A1 | 1/2016 | Saltzgiver |
| 2016/0137483 A1 | 5/2016 | Pfeiffer |
| 2016/0146659 A1 | 5/2016 | Saltzgiver et al. |
| 2016/0178426 A1 | 6/2016 | Gurumohan |
| 2016/0194190 A1 | 7/2016 | Fogg |
| 2016/0198246 A1 | 7/2016 | Gurumohan |
| 2016/0264394 A1 | 9/2016 | Hershberger |
| 2017/0027229 A1 | 2/2017 | Cameron |
| 2017/0161676 A1 | 6/2017 | Aji |
| 2017/0292870 A1 | 10/2017 | Carter |
| 2017/0332813 A1 | 11/2017 | Baltek |
| 2017/0337496 A1 | 11/2017 | Jones |
| 2017/0337535 A1 | 11/2017 | Jones |
| 2017/0340147 A1 | 11/2017 | Hambrock |
| 2017/0341830 A1 | 11/2017 | Nishizawa |
| 2018/0164143 A1 | 6/2018 | Gurumohan |
| 2018/0202853 A1 | 7/2018 | Boström |
| 2018/0328776 A1 | 11/2018 | Gurumohan |
| 2019/0242816 A1 * | 8/2019 | Conner ............... G01N 33/04 |
| 2019/0274456 A1 | 9/2019 | Hambrock |
| 2020/0033179 A1 | 1/2020 | Gurumohan |
| 2020/0056919 A1 | 2/2020 | Jones |
| 2020/0172387 A1 | 6/2020 | Hershberger |

OTHER PUBLICATIONS

Jonah Comstock. Slideshow: 8 Pillboxes that Connect to Your Phone. Mobihealth News. Mar. 13, 2013. http://mobihealthnews.com/20795/slideshow-8-pillboxes-that-connect-to-your-phone/2/.

Kreutzer et al., "Radio Frequency Identification Based Detection of Filling Levels for Automated Monitoring of Fluid Intake", Dec. 5, 2014, Proceedings of the 2014 IEEE International Conference on Robotics and Biomimetics, pp. 2049-2054.

Matthew Tait, "Smart Drink Bottle", Sep. 10, 2018, ip.com, IPCOM000255205D, pp. 1-23.

Sing et al., "A Microcontroller-based System for Liquid Level Detection Using Infrared Sensing", 2015, 2015 IEEE Student Conference on Research and Development (SCOReD), pp. 294-299.

* cited by examiner

FOULING MITIGATION AND MEASURING VESSEL WITH CONTAINER FILL SENSOR

CROSS REFERENCE TO OTHER APPLICATIONS

This application claims priority to U.S. Provisional Patent Application No. 62/683,834 entitled SMART MEASURING CAP FOR CONTAINER filed Jun. 12, 2018 which is incorporated herein by reference for all purposes, and claims priority to U.S. Provisional Patent Application No. 62/778,805 entitled SMART MEASURING CAP filed Dec. 12, 2018 which is incorporated herein by reference for all purposes.

BACKGROUND OF THE INVENTION

Consumable products (e.g., laundry detergent) are often sold and stored in product containers. In many instances, a consumer periodically performs a visual check to inventory contents remaining in containers. This manual process is often laborious, imprecise, and error prone. For example, it is often difficult for a person to visually determine an amount of content remaining in an opaque container with precision in a reliable manner. Also, one may forget to check the amount of content remaining in the container before running out of the contents at an inopportune time.

BRIEF DESCRIPTION OF THE DRAWINGS

Various embodiments of the invention are disclosed in the following detailed description and the accompanying drawings.

DETAILED DESCRIPTION

Figure 1:
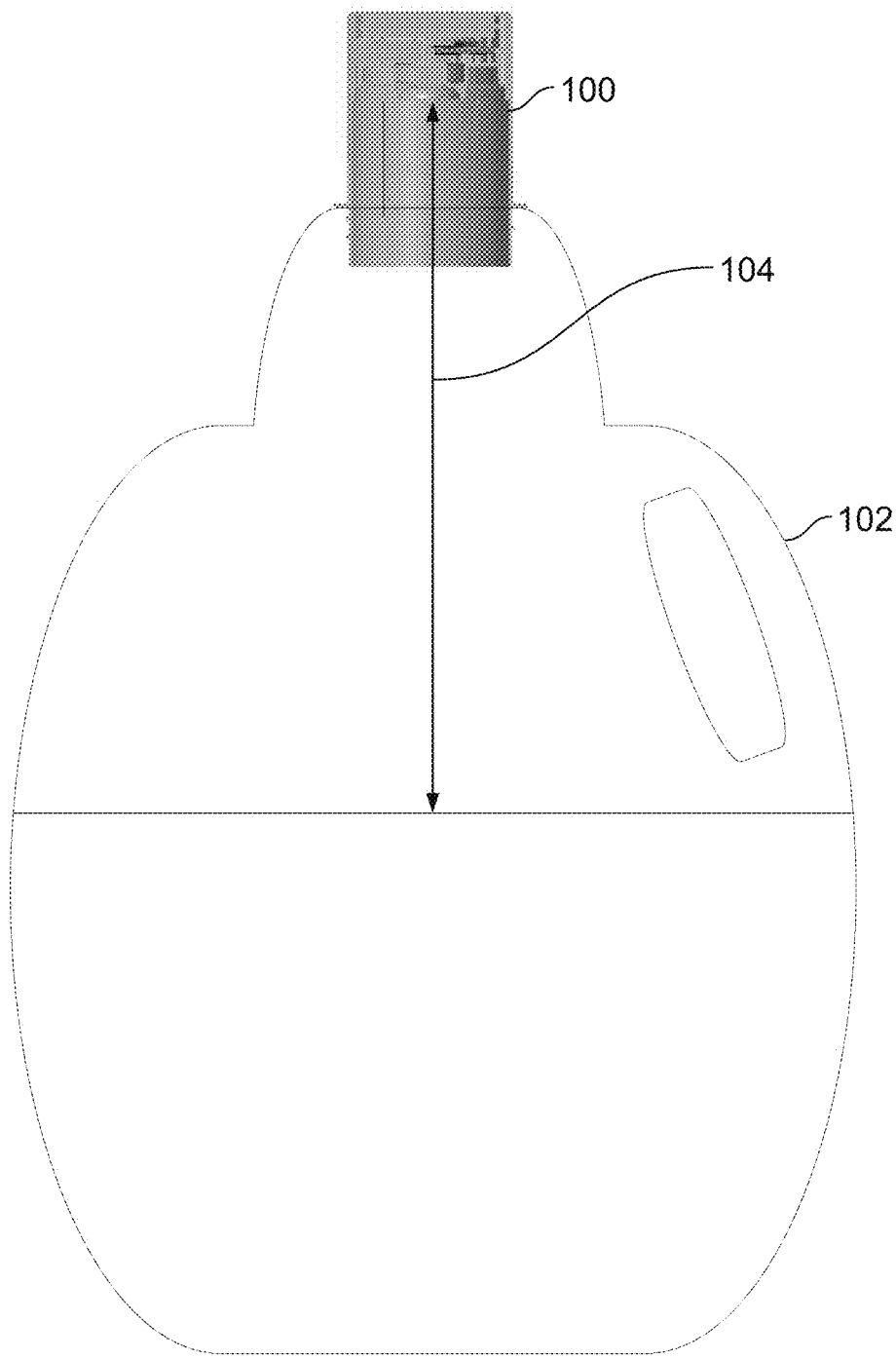
FIG. 1 is a diagram illustrating an embodiment of a fill level sensor device engaged in a container.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A sensor device is disclosed. For example, the sensor device is a container cover (e.g., sensor device also functions as a cap on a laundry detergent bottle) that electronically measures an amount of liquid remaining in a container (e.g., consumable product container) engaged with the container cover. Examples of the container include a beverage container, a liquor container, a food container, a medicine container, a personal care product container, a shampoo/conditioner container, a laundry detergent container, a cleaning product container, an automotive fluid container, an industrial product container, or any other container configured to hold a liquid, a gel, a pill, a powder, item pieces, packets, a grain, or any other dispensable item. In some embodiments, the sensor device includes a content level sensor. For example, the sensor transmits an ultrasonic signal and measures the amount of time it takes for the signal to bounce off a content remaining in the container and return back to the sensor to determine the content level remaining in the container. The sensor device includes a transceiver or a transmitter that transmits an interrogation signal. For example, the transceiver transmits an ultrasonic signal. The transceiver or receiver receives the interrogation signal that has been reflected within the container. For example, the received interrogation signal is processed to determine a distance traveled by the signal that corresponds to a fill level of the container. In some embodiments, using a pre-determined distance to volume table for the container, a volume of content left in the container can be determined. The sensor device includes a processor configured to process the received reflected version of the interrogation signal to determine an identifier associated with an amount of content in a container engaged by the sensor device. The sensor device also includes a wireless signal transmitter configured to transmit the identifier associated with the amount of content in the container.

In some embodiments, the sensor device is configured to be a measuring vessel. For example, the sensor device is a cap of a container and also a measuring cup to be used to measure out and dose contents of the container (e.g., contents of the container to be poured into the measuring vessel to measure out a quantity to be used). In this example, when the sensor device is used as a measuring vessel, the sensor device is in a first orientation (e.g., upside down with the opening of the measuring chamber facing up), and when the sensor device is used as a container fill measurement sensor (e.g., as a cap), the sensor device is in a second orientation (e.g., with the opening of the measuring chamber facing down into the container). The sensor device includes physical level markings to indicate an amount of quantity corresponding to markings and/or a digital sensor (e.g., capacitive and/or strain/weight sensor) configured to sense an amount of content contained in the sensor device.

When the sensor device is used as a measuring vessel, the contents being measured may come into direct contact and foul the transmitter, receiver and/or transceiver. The layer of contents fouling and remaining on the transmitter, receiver and/or transceiver may hinder fill level measurement performance of the sensor device. For example, the interrogation signal may be unable to pass through the fouling layer. In some embodiments, a frequency of the transmitted signal (e.g., equal to or above 80 kHz) is selected to allow it to at least in part pass through the contents fouling the transmitter, receiver and/or transceiver. For example, a transmitter/transceiver is configured to transmit a signal with a frequency (e.g., equal to or above 80 kHz, such as 300 kHz) and/or power/amplitude selected to allow the signal to at least in part pass through a content fouling and covering at least a portion of the transmitter/transceiver and be reflected back from content remaining in the container and be received though the fouling content at a receiver/transceiver. With specific selected frequencies (consequently shorter wavelength) of the transmitted signal and sufficient power (e.g., signal amplitude), the transmitted signal is able to pass through the fouling layer of the container content remaining on the signal transmitting and/or receiving component.

In various embodiments, the transmitter, receiver, and/or transceiver may be placed in various orientations and structures that overcome or reduce sensor fouling by the contents of the container. In some embodiments, several new sensor orientations and structures were developed that overcome the sensor fouling using passive mechanical structures. The passive mechanical structure allows for the liquid to drain off with time and gravity. The passive mechanical structure also helps shape the beam. An included sensor fouling mitigation mechanism may include but is not limited to: a selected frequency and/or a selected power/amplitude able to transmit through the fouling content on the transmitter, receiver, or transceiver; a motorized wiper; an ultrasonic micro pump; a mechanical contraption that hides the sensor when used for measuring the contents of the container; the geometric shape of a guide surrounding the transmitter, receiver, or transceiver combined with a material that assists the contents to drip off quickly, etc.

In some embodiments, the transmitter/receiver or transceiver is configured to be facing an interior of the container when the container cover engages the container. Because the transmitter/receiver or transceiver may be adversely damaged/affected by contents of the container while inside the container, the transceiver may be required to be protected from the contents of the container. For example, chemicals in the contents of the container may damage the transceiver if it comes in direct contact. In some embodiments, a protective material (e.g., epoxy) covers at least the transceiver. The protective material may protect the transceiver from direct exposure to contents of the container.

In some embodiments, the sensor device includes a sensor that detects that the device has been triggered. For example, an accelerometer, gyroscope, motion, and/or orientation sensor included in the sensor device detects movement and/or orientation of the sensor device. Detected movement and/or detected orientation (e.g., cap tilted to allow opening to face up) may correspond to dispensing contents from the container associated with the sensor device (e.g., sensor device measuring cap removed from container to pour contents out of the container and into the sensor device measuring cap for dosing measurement). This may trigger a detection of an amount of content inside the measuring cap (e.g., capacitive and/or weight sensor). When it is detected (e.g., corresponding orientation for a threshold amount of time without movement detected using the accelerometer sensor) that the sensor device is back on the container, a measurement of a fill level of contents in the container using the ultrasonic interrogation signal may be initiated. Because it is power intensive to perform the measurement, using the triggering condition to initiate the measurement allows power to be conserved from not having to perform measurements when the triggering condition is not met.

When the transmitter or transceiver of the sensor device transmits an ultrasonic signal, the amount of time it takes for the signal to bounce off content remaining in the container and return back to the sensor is measured to determine the amount of content remaining in the container. However, not only does the reflected signal reflect off the content remaining in the container in a direct path, the transmitted signal reflects off walls of the container as well as the contents of the container in non-direct paths. Because multiple reflections are received by a receiver of the sensor device, any reflection that does not indicate the current fill level of the container needs to be minimized. In some embodiments, a signal shaping dome (e.g., waveguide) is placed over the transmitter or transceiver such that a signal transmitted by the transceiver is propagated via the dome and/or a signal received by the receiver or transceiver is received via the dome. For example, when the signal is emitted by the transceiver, the signal spreads out from the transceiver with a certain beam width. The dome helps narrow the beam width of the emitted signal by bouncing the signal that hits the walls of the dome to be redirected in a desired direction towards the contents of the container.

Despite efforts to reduce the unwanted reflections within the container, unwanted reflections off walls of the container as well as the contents of the container in non-direct paths will be detected by the signal receiver. Because multiple reflections are received by a receiver of the sensor device, the actual direct reflection that indicates the current fill level of the container needs to be identified among various detected reflections. For example, each reflection corresponds to different distances traveled by the interrogation signal and consequently corresponds to different potential container fill levels. The received signal is digitally analyzed and one of the reflections is selected as the selected reflection that corresponds to a selected container fill level. This selected container fill level is utilized to provide the current detected container fill level.

In some embodiments, the detected container fill level is used to automatically manage inventory of containers (e.g., products on hand). This allows automatic inventory management of remaining full containers as well as content remaining in an open container. When inventory level reaches a threshold, the container/product can be automatically reordered.

In some embodiments, the sensor device wirelessly provides measurement data to a mobile device and/or a base station device that relays the received measurement data (e.g., via a personal area network signal such as a BLUETOOTH signal) to a network cloud server. In some embodiments, the sensor device cap has Wi-Fi capability to allow the cap to connect to the Internet directly through a Wi-Fi router.

In some embodiments, an ecosystem (e.g., including the sensor device cap along with software applications and backend service) can be used to track the amount of content remaining (e.g., amount of laundry detergent and other consumer goods such as shampoo, mouth wash, other consumer packaged goods, etc.).

Using the ultrasound sensor, the depth change can be detected and the amount of liquid dispensed can be determined. However if the containers are wide/large (e.g., large horizontal cross-sectional area), the change in depth would be insignificant when small amounts are dispensed. In such a scenario other measurement methods can be used as supplemental measurements to confirm the amount dispensed. In some embodiments, a capacitive sensor or a weight sensor is used to detect the amount dosed/dispensed into the cup/cap. For example, a sensitive Wheatstone bridge, piezoelectric-based sensor, a load/force/pressure/resistive/strain/scale sensor, or other weighing mechanism packed in the top end of the cap would measure the amount dispensed. Using this in union with the depth measurement can provide a high accuracy of what was poured out. In some embodiments, using an ultrasonic sensor, the depth could be measured from the bottom up (e.g., direct contact method by measuring directly the measuring content depth).

In some embodiments, rather than only marking the passive load level markers on the wall of the cap, active load indicators can be built into the cap that actively indicate the level dispensed. In some embodiments, capacitive/resistive/force sensors in the cup/cap will indicate how much was poured into the cup/cap, rather than just relying on the load reading markers on the side of the wall. In some embodiments, a sound or haptic buzzer is utilized. For example, each buzz will indicate the load amount (e.g., one buzz=one load, two buzzes=two loads, etc.). In some embodiments, light is utilized. For example, intensity/color of the light will change in relationship to the load amount.

Often electronic devices need user intervention to trigger when the device will begin to operate. This requires the user to interact with a button or other trigger and wake up the device to begin use. The wake up trigger can be detected with an action which the user would already perform through normal use of the device. For example, it may be gesture-based (e.g., by twisting or tilting the cap), wrapper-based (e.g., by hiding a sensed element in the wrapper (e.g., magnet, attached conductive element, or passive radiating element)), ambient light-based (e.g., by using a light sensor to detect when the device is removed from the packaging) and/or based on detecting presence.

FIG. 1 is a diagram illustrating an embodiment of a fill level sensor device engaged in a container. Container 102 is filled with a liquid. In the example shown, fill level sensor device 100 is configured as a container cover (e.g., a measuring cup cap). The liquid fill level of container 102 may be determined by measuring the distance between sensor device 100 and the liquid surface of container 102. As shown by line 104, a transmitter/transceiver of sensor device 100 sends out a signal (e.g., ultrasonic signal) that gets reflected by the surface of the liquid. The reflected signal is detected by a receiver of sensor device 100.

By measuring the amount of time it took to receive the reflected signal, the distance traveled by the signal before being reflected (e.g., distance between sensor device 100 and the liquid surface is half of the total distance traveled by the signal) may be determined by multiplying the amount of time by the speed of the signal (e.g., speed of sound).

In some embodiments, to determine the amount of time it took to receive the reflected signal, the received reflected signal is filtered to isolate the desired signal (e.g., band-pass filter the received signal), amplified, and analyzed to detect peaks that correspond to when the reflected signal was received. A predetermined beginning portion (e.g., predetermined amount of time in the beginning of the signal) of the received signal may be ignored when analyzing the signal to ignore signals that were detected due to coupling between the transmitted and received signals of the transceiver of sensor device 100. For example, when the transmitter or transceiver transmits the signal, the signal may be received by the receiver or the transceiver of sensor device 100 before the signal is reflected by the contents of the container, and the undesired received signals received in the beginning portion of the received signal are ignored when identifying the desired received reflected signal.

If the total distance between the bottom of container 102 and sensor device 100 is known, the fill height of container 102 can be determined (e.g., total distance between bottom and sensor device 100 minus distance between sensor device 100 and liquid surface). If the shape and volume of the bottle are known, the volume of liquid contained in container 102 may be determined. For example, a table/database/data structure that maps fill level (e.g., fill height, height between liquid surface and sensor device 100, etc.) to liquid volume of the container is utilized to determine liquid volume corresponding to the determined fill level. Different tables/databases/data structures may exist for different types of containers.

Figure 2A:
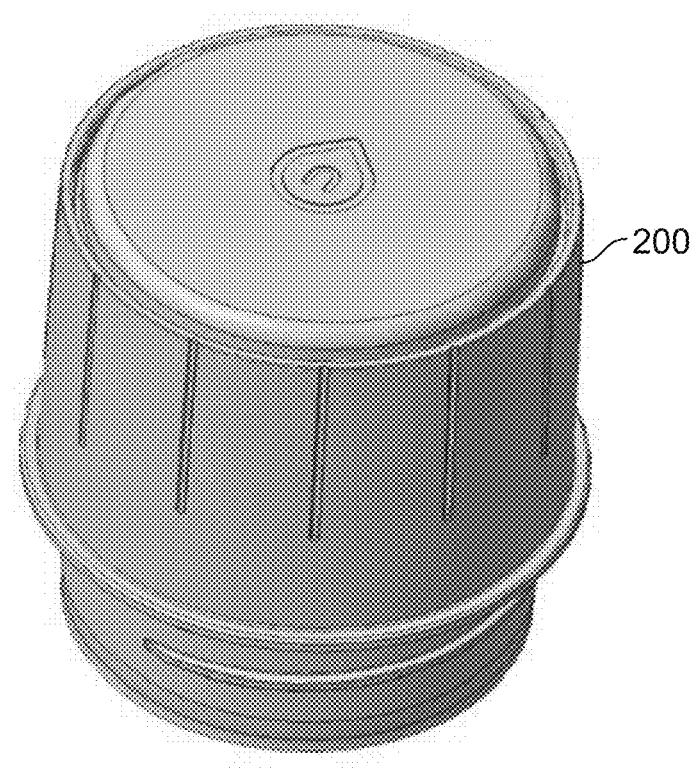
FIGS. 2A-2D show various views of an embodiment of a measuring cap fill level sensor device.
Figure 2B:
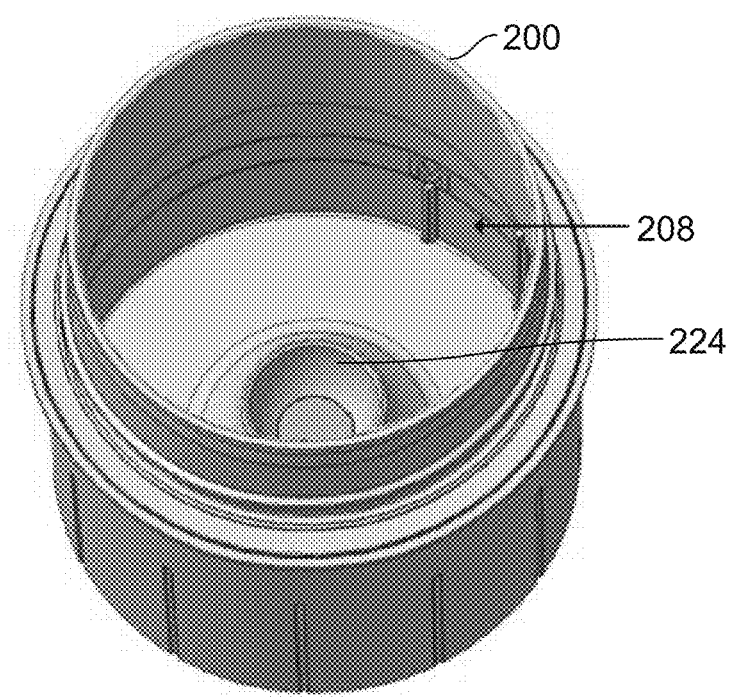
Figure 2C:
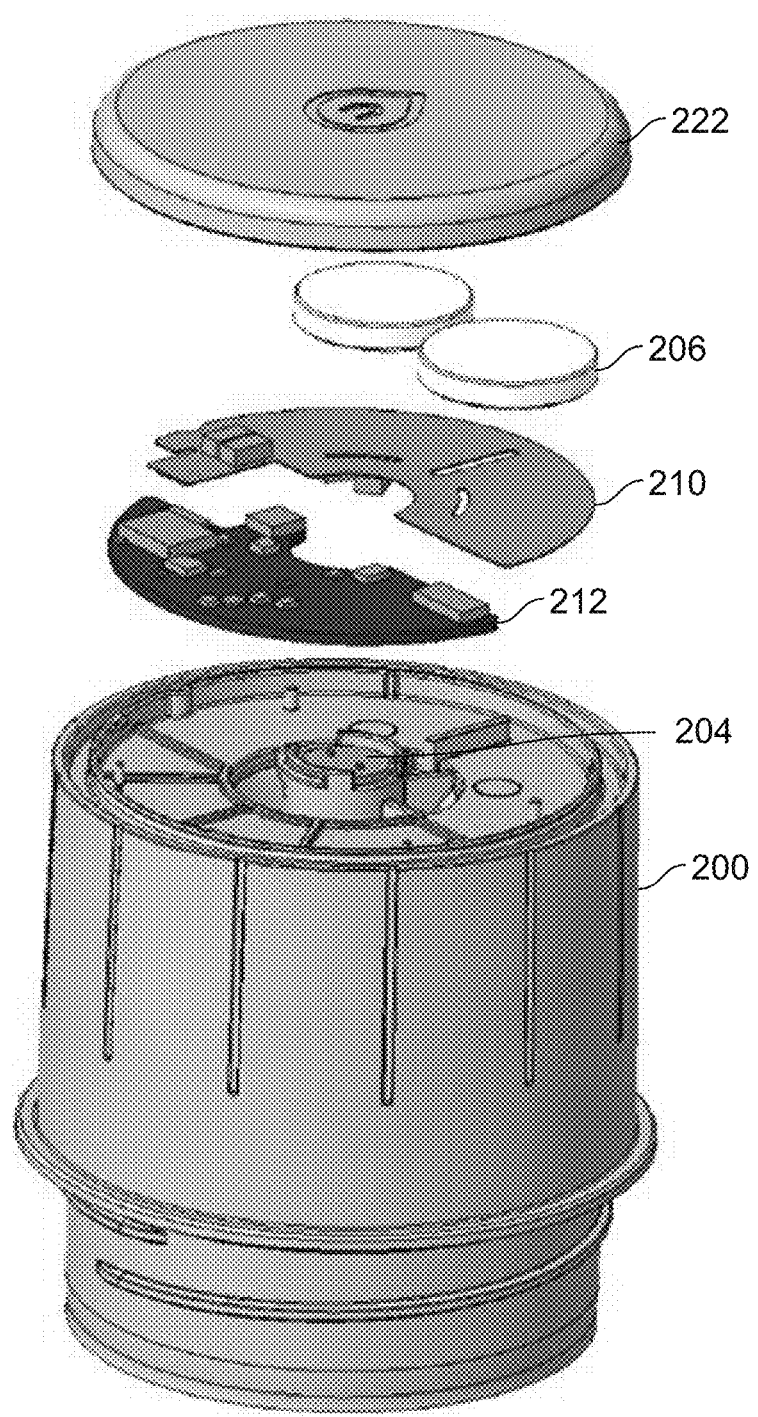
Figure 2D:
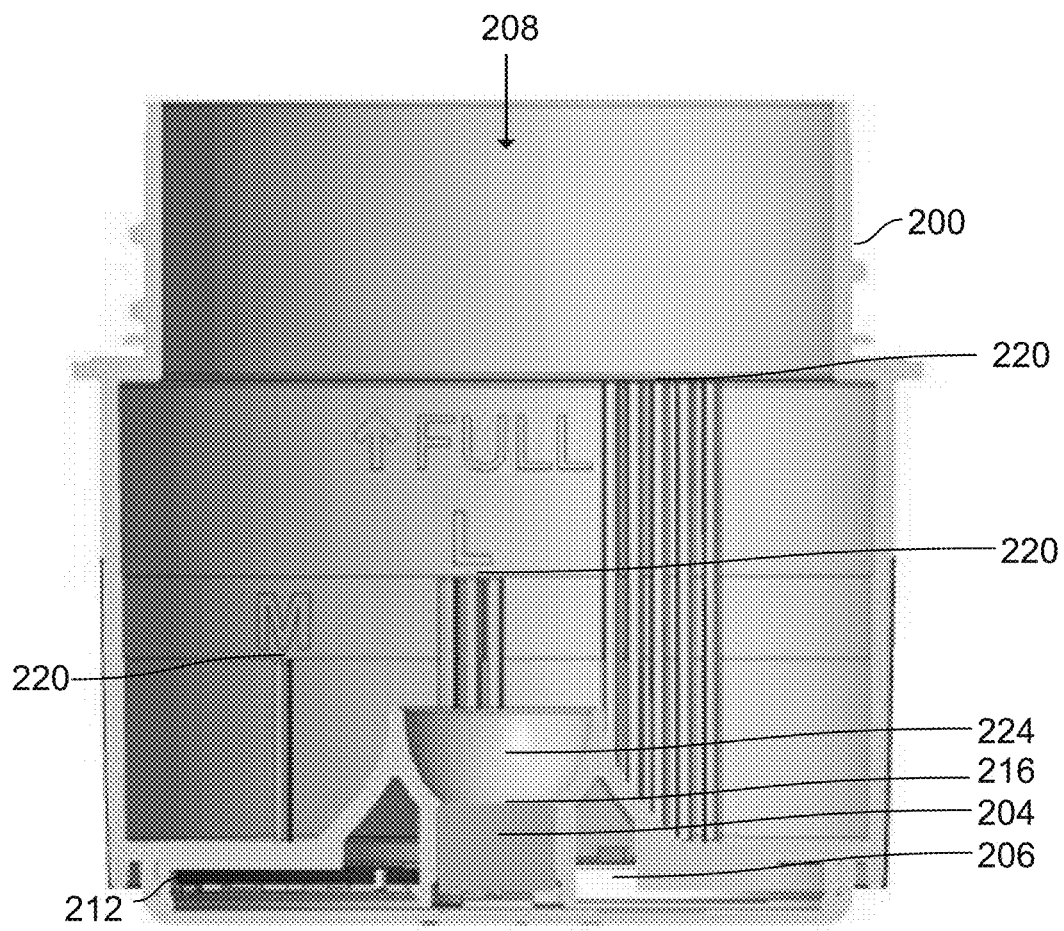

FIGS. 2A-2D show various views of an embodiment of a measuring cap fill level sensor device. FIG. 2A shows a top profile view of the embodiment of the sensor device. FIG. 2B shows a bottom profile view of the embodiment of the sensor device. FIG. 2C shows an exploded view of components of the embodiment of the sensor device. FIG. 2D shows a cross-sectional view of the embodiment of the sensor device.

In the examples shown, sensor device 200 is configured to function as a measuring cup. Sensor device 200 includes measuring chamber 208 formed by the walls of sensor device 200, allowing device 200 to serve as a measuring cup/vessel. The opening of chamber 208 allows contents (e.g., contents of container 102 of FIG. 1) to be poured in to measure a dose and poured out to dispense the dose. Markings 220 on an interior wall of chamber 208 each indicate a corresponding amount/level of content in chamber 208 if the liquid level of the content in the chamber lines up with a corresponding marking. Sensor device 200 includes threads for screwing on to a container (e.g., laundry detergent bottle). However, in other embodiments, sensor device 200 may be configured as a different cover of a different container. For example, the components of sensor device 200 may be included in a push fit or any other cap that engages a container.

Sensor device 200 includes circuit board 212. For example circuit board 212 is a printed circuit board. Circuit board 212 may connect together one or more of the following included in sensor device 200: a processor, a memory, a data storage, a connector, an integrated chip, a transceiver, an accelerometer, a tilt sensor, an orientation sensor, a weight sensor, capacitive sensors, a light indicator, a speaker, a sound generator, a haptic feedback component, a vibration generator, an eccentric rotating mass actuator, a solar panel, a display, a gyroscope, a wireless data communication signal transmitter (e.g., a component able to communicate using BLUETOOTH, Wi-Fi, Zigbee, Z-Wave, other wireless protocols, etc.), and other electrical components. For example, a processor connected to circuit board 212 provides a command to transmit an acoustic signal using a transceiver and processes a received signal to determine a fill level indicator. The fill level indicator may be transmitted wirelessly to another device such as a mobile device, a computer, a display device, or any other computing or display device using a wireless data communication transmitter. Circuit board 212 is connected to batteries 206 via power board 210. Battery 206 provides power to the circuit of circuit board 212. Battery 206 may be rechargeable and/or replaceable. For example, device top cover 222 is removable to allow battery 206 to be replaced once depleted. As shown in the example, a plurality of batteries may be used and positioned next to each other inside device 200. The housing of sensor device 200 may be composed of one or more materials. Examples of the materials include a food grade polymer, elastomer, plastic, rubber (e.g., synthetic or otherwise), stainless steel, and other metals.

Circuit board 212 is electrically connected to transceiver 204. In some embodiments, transceiver 204 functions as an acoustic transmitter (e.g., ultrasonic signal transmitter). In some embodiments, transceiver 204 is a piezoelectric component. In some embodiments, transceiver 204 is configured to transmit a signal within the ultrasonic frequencies. Transceiver 204 is also able to function as a receiver (e.g., ultrasonic signal receiver). Although device 200 includes a single transceiver that can function both as a transmitter and a receiver, in other embodiments a separate transmitter is used to transmit a signal and a separate receiver is used to receive the signal that has been reflected. In some embodiments, transceiver 204 is configured to transmit a signal with a frequency (e.g., equal to or above 80 kHz) and/or power/amplitude selected to allow the signal to at least in part pass through a content fouling and covering at least a portion of transceiver 204 and be reflected back from content remaining in the container and be received though the fouling content at transceiver 204. For example, transceiver 204 is configured to transmit a signal with a frequency of 300 kHz.

In some embodiments, because debris, liquid, gel, chemicals and other materials may affect the performance and durability of transceiver 204, protective material 216 covers transceiver 204. Ideally the protective material must not allow undesired material through while at the same time allowing signals (e.g., ultrasonic signals) to pass through. In some embodiments, protective material 216 is a chemical resistant epoxy coating that covers a face of transceiver 204 as well as seal a gap between transceiver 204 and the surrounding assembly/body of sensor device 200. For example, protective material 216 covers a bottom of dome 224 where transceiver 204 transmits and receives signals. Other examples of protective material 216 include one or more of the following: Mylar sheet, waterproof mesh, acoustic sheet, Teflon, Gortek, polytetrafluoroethylene (PTFE), polyethylene terephthalate (PET), polyethylene terephthalate glycol-modified (PETG), polycarbonate, and any other appropriate mesh or membrane that may be porous or non-porous. In some embodiments, protective material 216 is an acoustically transmissive liquid/chemical blocking material. In some embodiments, protective material 216 is optional.

In some embodiments, signal shaping dome 224 redirects and shapes a signal emitted by transceiver 204 down towards contents of a container to be measured by reflecting the signal towards the desired direction. For example, when the transmitted interrogation signal has a large beamwidth and the sensor device is engaged with a container with a narrow neck and dramatic variations in shape, the reflection coming back from the contents in the container will include other aliases as a result of multiple path reflections and impedance changes. By reducing the effective beamwidth of the signal using dome 224, undesired signal reflections may be mitigated. The sloping angles of the interior walls of dome 224 help focus the signal beam such that energy is collimated to travel in a desired direction down towards contents of the container. In some embodiments, the interior walls of dome 224 include internal sidewalls with varying slopes. The shown shaping dome 224 surrounds the transceiver (e.g., acting as a waveguide) and forms sloping walls of at least a portion of an open cavity where the ultrasonic signal originates. In some embodiments, a bottom of shaping dome 224 surrounds at least a transmitting surface interface of an ultrasonic transceiver (e.g., protective material in front of the transceiver). The different slopes of the interior walls of dome 224 allow different signal portions that radiate from the transmitter at different angles to be redirected towards the same desired direction.

In some embodiments, internal wall slope and/or exterior wall slope of shaping dome 224 functions as a drip collector. Because transceiver 204 and/or protective material 216 is exposed to the content of the container when device 200 is placed upside down and utilized as a measuring vessel, liquid, gel or other content of the container covers and coats transceiver 204 and/or protective material 216.

This coated content on device 200 (e.g., on the transceiver or protective material over transceiver) may foul the transceiver and interfere with signal transmission and detection required to detect fill levels of the container. For example, when liquid covers protective material 216, it may interfere with signal transmission or signal detection of transceiver 204. In order to reduce the chances of content remaining on the surfaces of protective material 216, the interior wall of chamber 224 is shaped to pull away content remaining on protective material 216. For example, when device 200 is placed upright, the slope of the interior side walls of chamber 224 aids the gravitational pull of any content covering protective material 216 back down into the container. When content on the interior chamber wall is pulled down along the slope of the interior walls of chamber 224 by gravitational forces, content remaining on protective material 216 may also be pulled along the slope of the drip collectors back down into the container. In some embodiments, the chamber walls functioning as drip collectors aid in the breaking of the surface tension of content deposited on protective material 216 by wicking away the content with the aid of the slope of the interior walls of chamber 224 that leverages the gravitational pull down the slope of the drip collectors. In some embodiments, the surfaces of the interior walls of chamber 224 have been formed and/or coated to be substantially smooth (e.g., to further reduce friction/tension as moisture is wicked away). Examples of the composition material of shaping dome 224 include a food grade polymer, polycarbonate, polyethylene terephthalate (PETE), polytetrafluoroethylene (PTFE), plastic, rubber, stainless steel, and other metals. In some embodiments, the interior chamber of shaping dome component 224 is coated with a dampening material. For example, an acoustic signal dampening material (e.g., rubber like material) coats plastic walls of the chamber and the coating may assist in reducing the amount of signal that bounces off the walls of the chamber.

Figure 3:
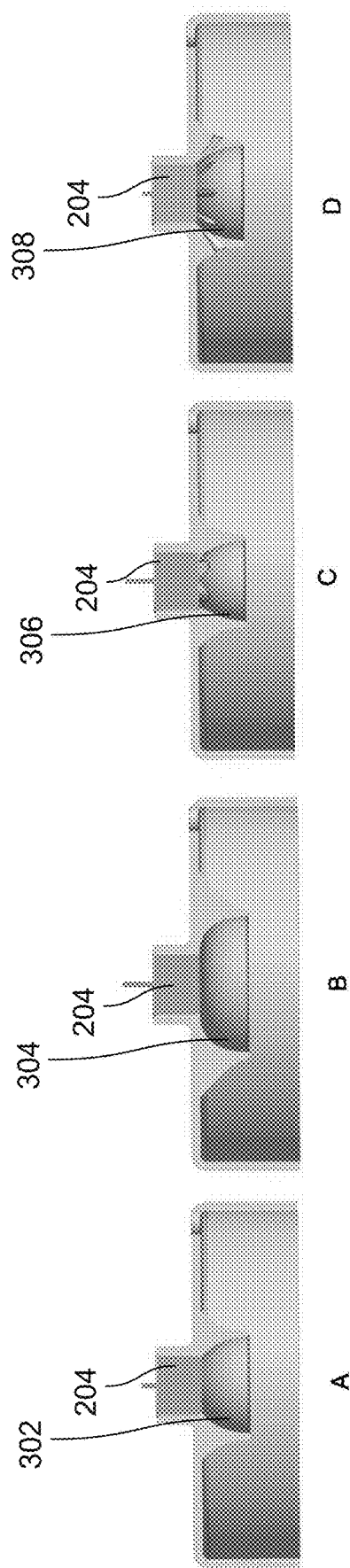
FIG. 3 shows diagrams illustrating various different embodiments of a shaping dome.

FIG. 3 shows diagrams illustrating various different embodiments of a shaping dome. The shown shaping domes are various different embodiments and shapes of shaping dome 224. Shaping domes 302, 304, 306, and 308 are open at the bottom to allow signal transmitted by transceiver 204 to pass through. Shaping dome 302 has a sharper passive rib (e.g., length 8 mm, 6 mm, or 4 mm). Shaping dome 304 has a shallower passive rib (e.g., length 8 mm, 6 mm, or 4 mm). Shaping dome 306 has a sharper passive rib with overlapping teeth. Shaping dome 308 is ported with open hollow channels.

Figure 4A:
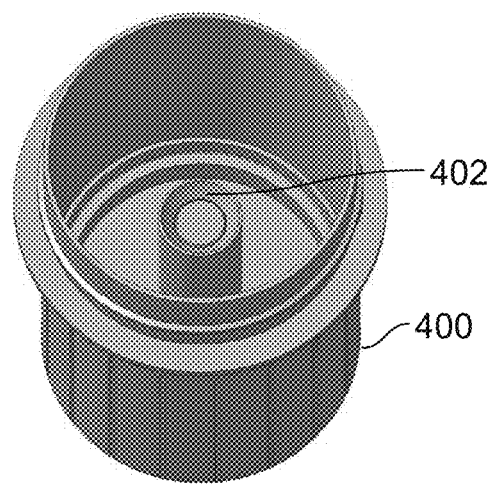
FIGS. 4A and 4B are diagrams illustrating various views of an embodiment of a measuring cap fill level sensor device with a raised stem.
Figure 4B:
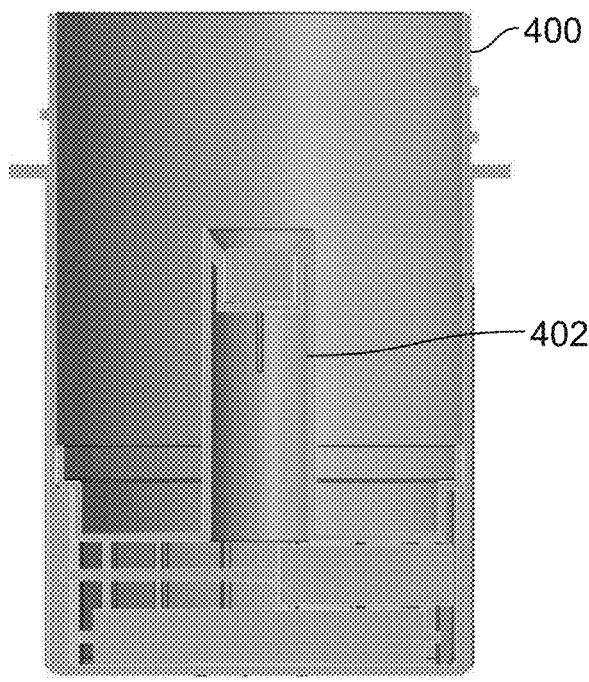

FIGS. 4A and 4B are diagrams illustrating various views of an embodiment of a measuring cap fill level sensor device with a raised stem. FIG. 4A shows a profile view and FIG. 4B shows a cutaway view. In order to reduce fouling of the signal transceiver, transmitter, and/or receiver, the signal transceiver, transmitter, and/or receiver is placed in a raised stem. FIGS. 4A and 4B show sensor device 400 with raised stem 402. Device 400 is a version of sensor device 200 shown in FIGS. 2A-2D with a raised stem that includes the transceiver and the signal shaping dome. Components same or similar to ones on sensor device 200 have been omitted to illustrate the embodiment clearly. Other corresponding components of sensor device 200 are also included in sensor device 400. The raised stem extends out from the base of the content measuring chamber and allows content to be poured into the measuring chamber without submerging the transmitting/receiving surface of the transceiver under the poured content. This reduces the amount of content remaining on the transmitting/receiving surface of the transceiver and minimizes the sensor fouling by the content of the container poured into the measuring chamber for dosing.

Figure 5A:
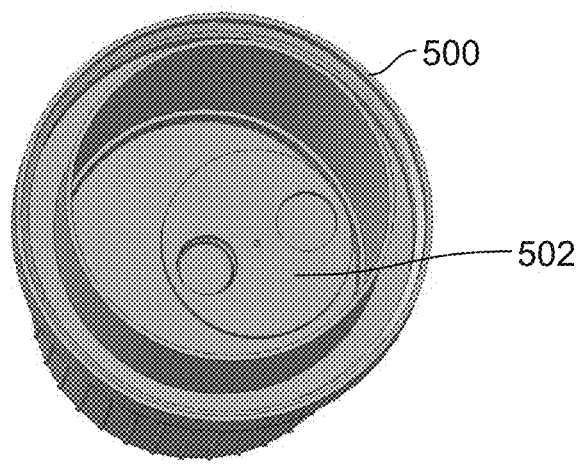
FIGS. 5A and 5B are diagrams illustrating various views of an embodiment of a measuring cap fill level sensor device with a shutter.
Figure 5B:
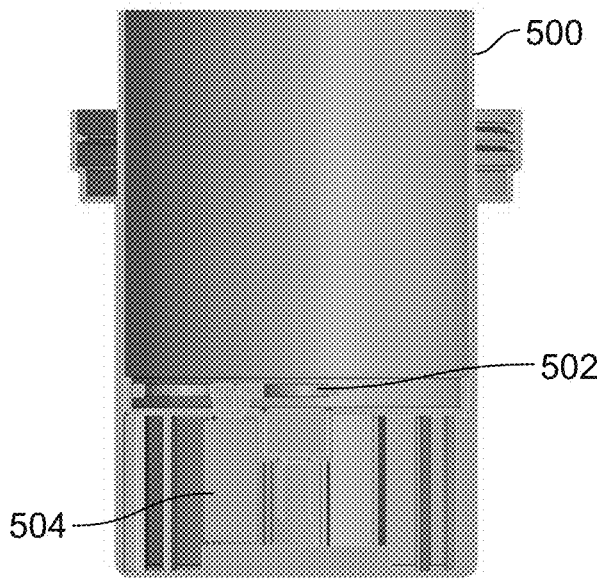

FIGS. 5A and 5B are diagrams illustrating various views of an embodiment of a measuring cap fill level sensor device with a shutter. FIG. 5A shows a profile bottom view and FIG. 5B shows a cutaway view. In order to reduce fouling of the signal transceiver, transmitter, and/or receiver, the signal transceiver, transmitter, and/or receiver is placed behind an actuated shutter (e.g., rotating) with openings that align with the transceiver, transmitter, and/or receiver to allow signals to pass through when desired and closed sections that close the transceiver, transmitter, and/or receiver to prevent content from contact by content placed in the sensor device measuring chamber/cup. FIGS. 5A and 5B show sensor device 500 with shutter disk 502. Device 500 is a version of sensor device 200 shown in FIGS. 2A-2D with at least an addition of shutter disk 502 that rotates either to cover the transceiver or provide an opening to the transceiver as desired. For example, shutter disk 502 includes openings that allow the transceiver to be exposed when taking a measurement of content level of a container and closed at other times (e.g., when used as a measuring cup to measure dose). Components same or similar to ones on sensor device 200 have been omitted to illustrate the embodiment clearly. Shutter disk 502 rotates about its center via motor 504. Motor 504 rotates shutter disk 502 to align its opening to expose the surface of the transceiver transmitting/receiving signals at a first instance and rotates shutter disk 502 to not align its opening at a second instance. This allows the transceiver to be protected behind the shutter disk when content is poured into the measuring chamber. This reduces the amount of content remaining on the transmitting/receiving surface of the transceiver and minimizes the sensor fouling by the content of the container poured into the measuring chamber for dosing.

Figure 6A:
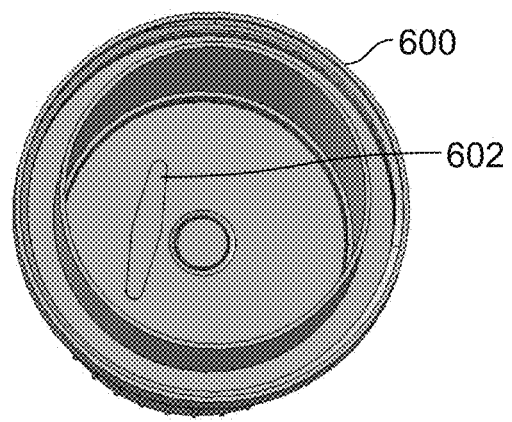
FIGS. 6A and 6B are diagrams illustrating various views of an embodiment of a measuring cap fill level sensor device with a wiper.
Figure 6B:
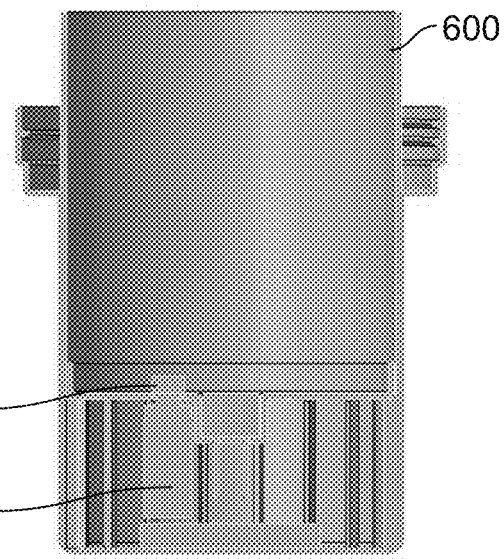

FIGS. 6A and 6B are diagrams illustrating various views of an embodiment of a measuring cap fill level sensor device with a wiper. FIG. 6A shows a profile bottom view and FIG. 6B shows a cutaway view. In order to reduce fouling of the signal transceiver, transmitter, and/or receiver, an actuated wiper wipes the signal transceiver, transmitter, and/or receiver when desired to reduce the amount of content covering the transceiver, transmitter, and/or receiver. FIGS. 6A and 6B show sensor device 600 with wiper 602. Device 600 is a version of sensor device 200 shown in FIGS. 2A-2D with at least an addition of wiper 602 that rotates to wipe the transmitting/receiving surface of the transceiver. For example, wiper 602 is actuated prior to sending and/or receiving a signal via the transceiver. Components same or similar to ones on sensor device 200 have been omitted to illustrate the embodiment clearly. Wiper 602 rotates about its center via motor 604. In other embodiments, rather than using a motor, physical rotation of a component of sensor device 600 causes wiper 602 to rotate (e.g., rotation of body of device 600 when closing device 600 as a cap on a container rotates a gear that causes wiper 602 to rotate). This reduces the amount of content remaining on the transmitting/receiving surface of the transceiver when the sensor device is engaged with the container and reduces the sensor fouling.

Figure 7:
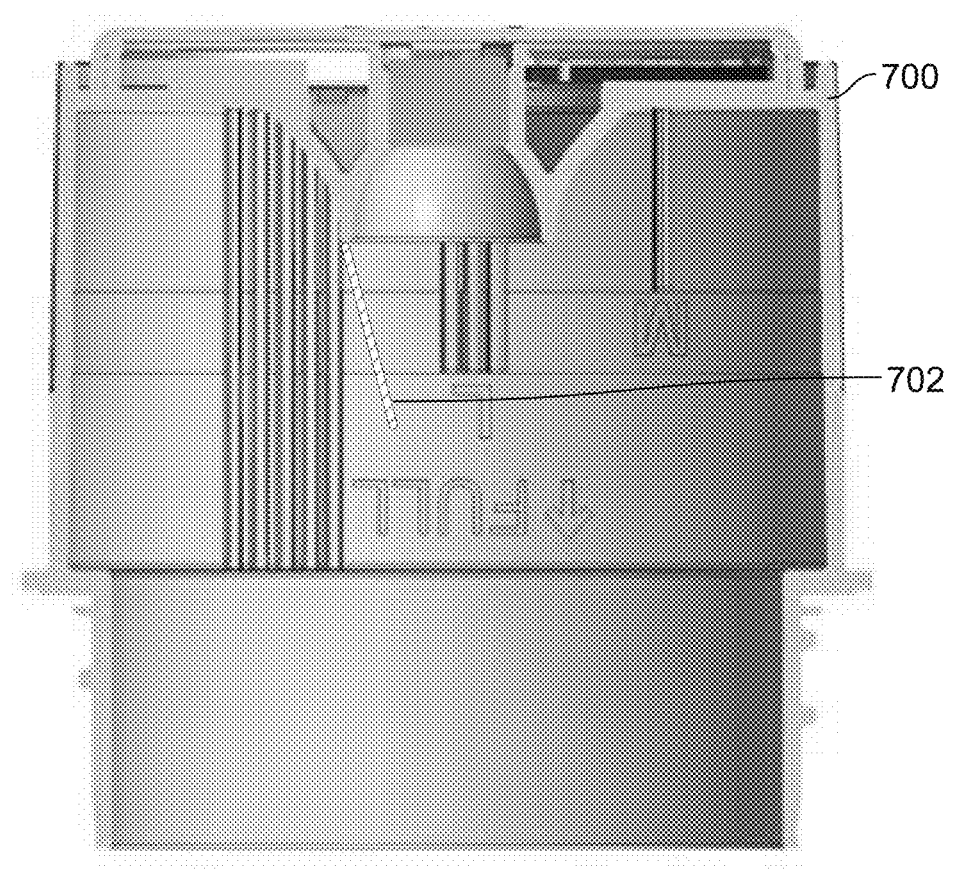
FIG. 7 is a cutaway diagram illustrating an embodiment of a measuring cap fill level sensor device with an actuated hatch.

FIG. 7 is a cutaway diagram illustrating an embodiment of a measuring cap fill level sensor device with an actuated hatch. In order to reduce fouling of the signal transceiver, transmitter, and/or receiver, the signal transceiver, transmitter, and/or receiver is placed behind an actuated hatch that covers the transceiver, transmitter, and/or receiver and opens to allow signals to pass through when desired. FIG. 7 shows sensor device 700 with hatch door 702. Device 700 is a version of sensor device 200 shown in FIGS. 2A-2D with at least an addition of actuated hatch door 702 that closes to cover the transceiver and opens to provide an opening to the transceiver as desired. For example, hatch door 702 opens to allow the transceiver to be exposed when taking a measurement of content level of a container and closed at other times (e.g., when used as a measuring cup to measure dose). Components same or similar to ones on sensor device 200 have been omitted to illustrate the embodiment clearly. Hatch door 702 may be actuated via a motor, an electromagnet, and/or a solenoid. This reduces the amount of content remaining on the transmitting/receiving surface of the transceiver and minimizes the sensor fouling by the content of the container poured into the measuring chamber for dosing.

Figure 8A:
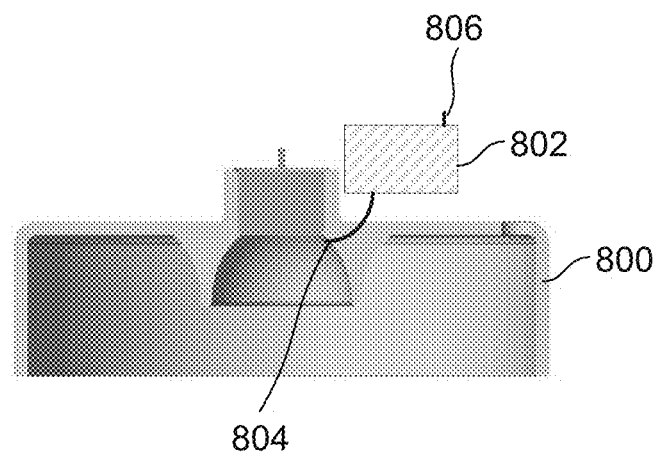
FIGS. 8A and 8B are diagrams illustrating different embodiments of components of a measuring cap fill level sensor device with a pump.
Figure 8B:
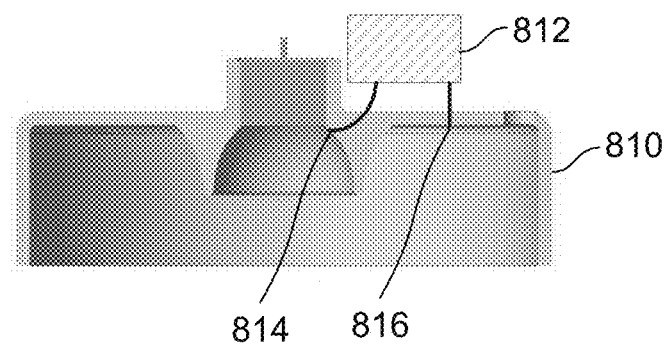

FIGS. 8A and 8B are diagrams illustrating different embodiments of components of a measuring cap fill level sensor device with a pump. FIG. 8A shows a cutaway view of a portion of sensor device 800. Device 800 is a version of sensor device 200 shown in FIGS. 2A-2D with at least an addition of pump 802 (e.g., blower) that blows air obtained via port 806 onto the transmitting/receiving surface of the transceiver via air output port 804. In order to reduce fouling of the signal transceiver, transmitter, and/or receiver, pump 802 outputs a burst of air to blow away content remaining on the signal transceiver, when desired. Components same or similar to ones on sensor device 200 have been omitted to illustrate the embodiment clearly. FIG. 8B shows a cutaway view of a portion of sensor device 810. Device 810 is a version of sensor device 200 shown in FIGS. 2A-2D with at least an addition of pump 812 (e.g., vacuum pump) that pulls/sucks content remaining on the transmitting/receiving surface of the transceiver. In order to reduce fouling of the signal transceiver, transmitter, and/or receiver, pump 812 pumps away the remaining content via input port 814 to vacuum away content remaining on the signal transceiver and deposit it back into an engaged container via output port 816, when desired. Components same or similar to ones on sensor device 200 have been omitted to illustrate the embodiment clearly. Each of these pumps act to reduce the amount of content remaining on the transmitting/receiving surface of the transceiver when the sensor device is engaged with the container and reduces the sensor fouling.

Figure 9A:
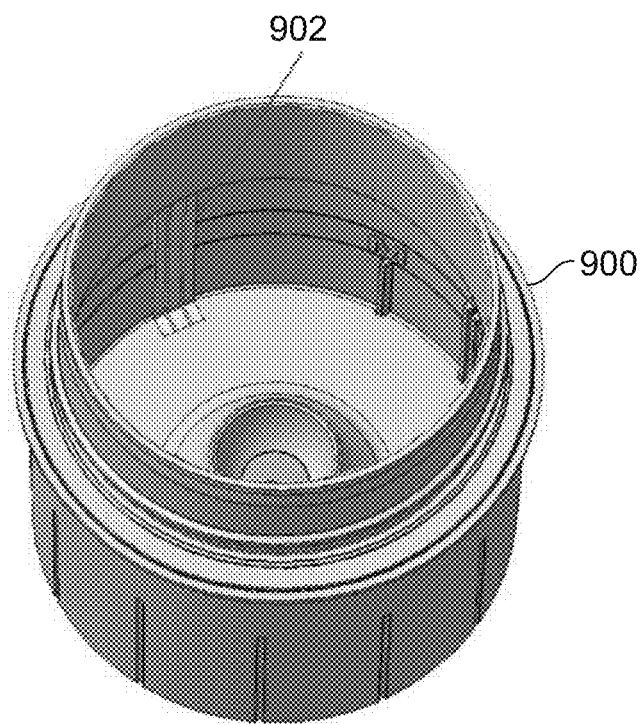
FIGS. 9A and 9B are diagrams illustrating various views of an embodiment of a measuring cap fill level sensor device with a measuring chamber content level sensor.
Figure 9B:
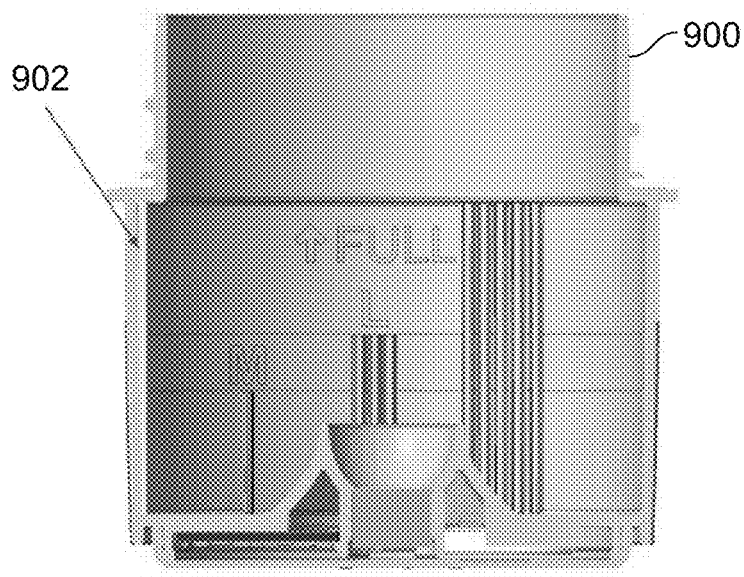

FIGS. 9A and 9B are diagrams illustrating various views of an embodiment of a measuring cap fill level sensor device with a measuring chamber content level sensor. FIG. 9A shows a profile bottom view and FIG. 9B shows a cutaway view. FIGS. 9A and 9B show sensor device 900 with capacitive sensors 902. Device 900 is a version of sensor device 200 shown in FIGS. 2A-2D with at least an addition of capacitive sensors 902. Components same or similar to ones on sensor device 200 have been omitted to illustrate the embodiment clearly. Using the ultrasound sensor, the depth change can be detected and the amount of liquid dispensed can be determined. However if the container is wide/large (e.g., large horizontal cross-sectional area), the change in depth would be insignificant when small amounts are dispensed. In such a scenario other measurement methods can be used as supplemental measurements to confirm the amount dispensed. Capacitive sensors 902 include a line of capacitors that each detect a change in capacitance. When content (e.g., liquid/gel) in the measuring chamber is touching capacitive sensors 902, its detected capacitance changes and the content level (e.g., liquid level) of the content in the measuring chamber can be determined by identifying which ones of the capacitors have detected a capacitance change corresponding to content contacting the capacitor. The position of the last capacitor in the line of capacitors in sensors 902 that has detected the content corresponds to the content level of the dose in the measuring chamber. The position of this last capacitor can be used to look up in a table or used in a calculation formula to determine the amount measured. This amount measured along with content level distance measurement information determined using the transceiver can be used to determine the amount left in the container capped by sensor device 900.

Figure 10A:
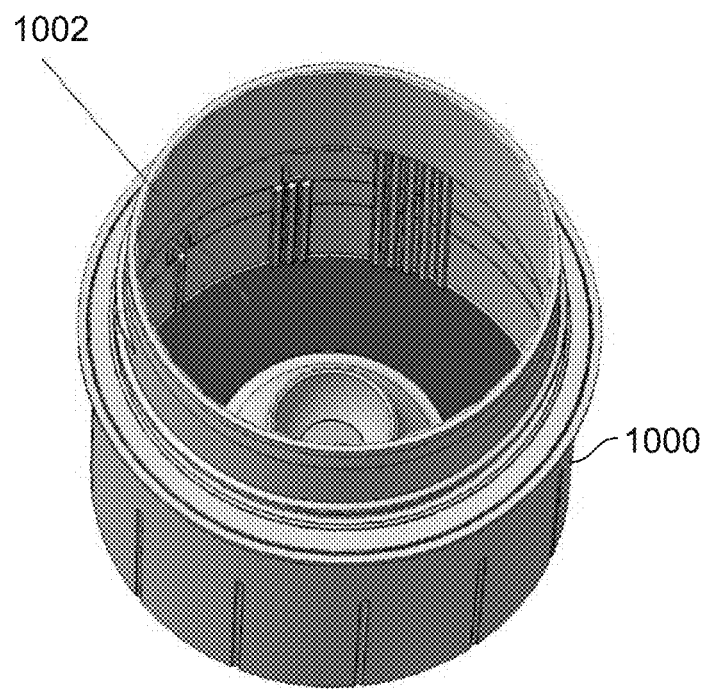
FIGS. 10A and 10B are diagrams illustrating various views of an embodiment of a measuring cap fill level sensor device with a measuring chamber content weight sensor.
Figure 10B:
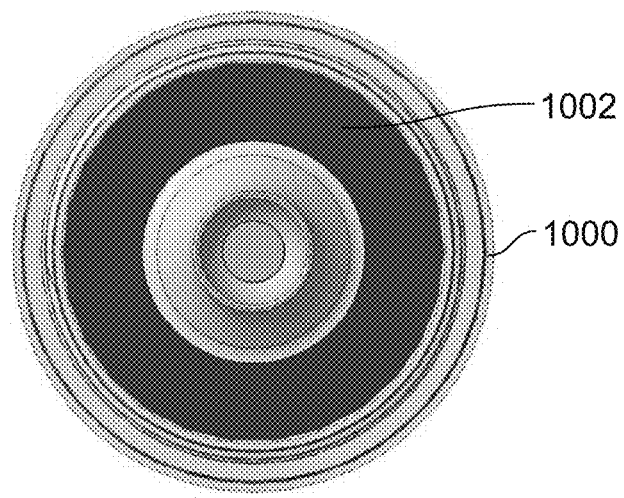

FIGS. 10A and 10B are diagrams illustrating various views of an embodiment of a measuring cap fill level sensor device with a measuring chamber content weight sensor. FIG. 10A shows a profile bottom view and FIG. 10B shows a bottom view into a measuring chamber. FIGS. 10A and 10B show sensor device 1000 with weight sensor 1002. Device 1000 is a version of sensor device 200 shown in FIGS. 2A-2D with at least an addition of weight sensor 1002. Components same or similar to ones on sensor device 200 have been omitted to illustrate the embodiment clearly. Using the ultrasound sensor, the depth change can be detected and the amount of liquid dispensed can be determined. However if the containers are wide/large (e.g., large horizontal cross-sectional area), the change in depth would be insignificant when small amounts are dispensed. In such a scenario other measurement methods can be used as supplemental measurements to confirm the amount dispensed. Weight sensor 1002 on the bottom of the measuring chamber includes a platform that presses against a weight sensing component. When the measuring chamber is filled with content, the content presses against the platform and/or the weight sensing component and the amount of load/force/pressure/resistance/strain is measured to determine an amount of content in the measuring chamber. Examples of the weight sensing component include, a sensitive Wheatstone bridge or piezoelectric-based load/force/pressure/resistive/strain/scale sensor or other weighing mechanism. The amount of load/force/pressure/resistance/strain can be used to look up in a table or used in a calculation formula to determine the amount measured. This amount measured along with content level distance measurement information determined using the transceiver can be used to determine the amount left in the container capped by sensor device 1000.

Figure 11A:
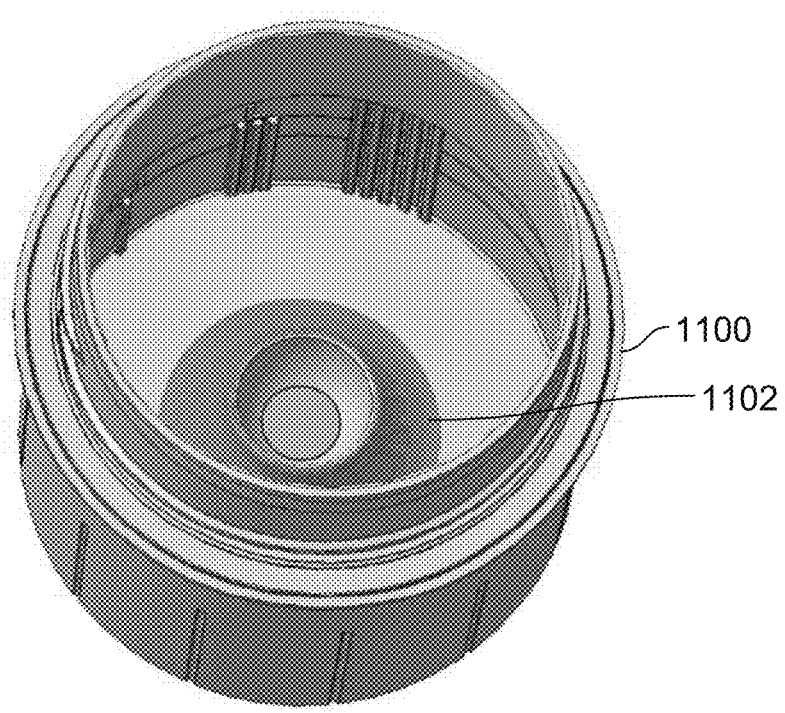
FIGS. 11A and 11B are diagrams illustrating various views of an embodiment of a measuring cap fill level sensor device with an indicator light.
Figure 11B:
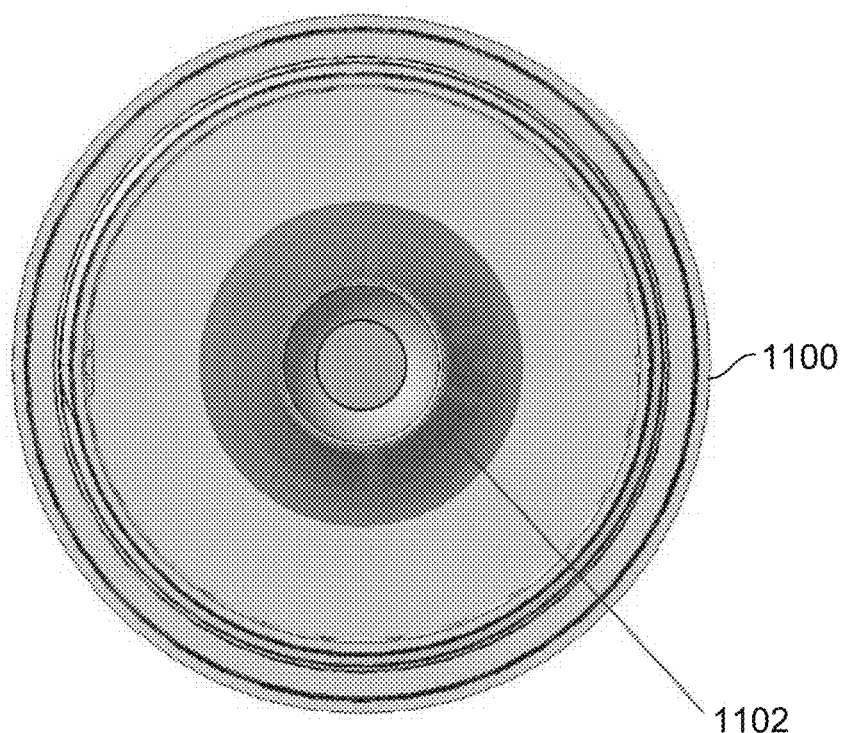

FIGS. 11A and 11B are diagrams illustrating various views of an embodiment of a measuring cap fill level sensor device with an indicator light. FIG. 11A shows a profile bottom view and FIG. 11B shows a bottom view into a measuring chamber. FIGS. 11A and 11B show sensor device 1100 with light component 1102. Device 1100 is a version of sensor device 200 shown in FIGS. 2A-2D with at least an addition of light component 1102. Components same or similar to ones on sensor device 200 have been omitted to illustrate the embodiment clearly. In some embodiments, rather or in addition to marking the passive load level markers on the wall of the sensor device, active load indicators can be built into the cap that actively indicate the level dispensed. In some embodiments, using the electronic capacitive/resistive/force sensor (e.g., shown in FIGS. 9A, 9B, 10A and 10B), the amount of content in the measuring chamber (e.g., measuring cup) can be determined. This information can be indicated using a light (e.g., load amount can be indicated by an activation of a light, a color, and/or a number of pulses). For example, when a threshold amount of content is detected in the measuring chamber, a light is turned on and/or a color of a light is changed. Various different amounts or levels of content can be indicated by different colors, light intensities, and/or number of light pulses. For example, a green light indicates when a first threshold amount is detected and a red light indicates when a second threshold amount is detected. Light component 1102 includes a light emitting diode and a light scattering lens. Other forms of lights or display may be utilized in various other embodiments.

In some embodiments, in addition to and/or instead of the light indicator, a sound, a vibration, a buzz, and/or haptic feedback associated with an amount of content in the measuring chamber is indicated. For example, each buzz will indicate by a speaker, a haptic feedback component, a sound generator, a buzzer, a vibration generator, and/or an eccentric rotating mass actuator the load amount (e.g., one buzz=a first threshold content amount detected, two buzzes=a second threshold content amount detected, etc.).

Figure 12:
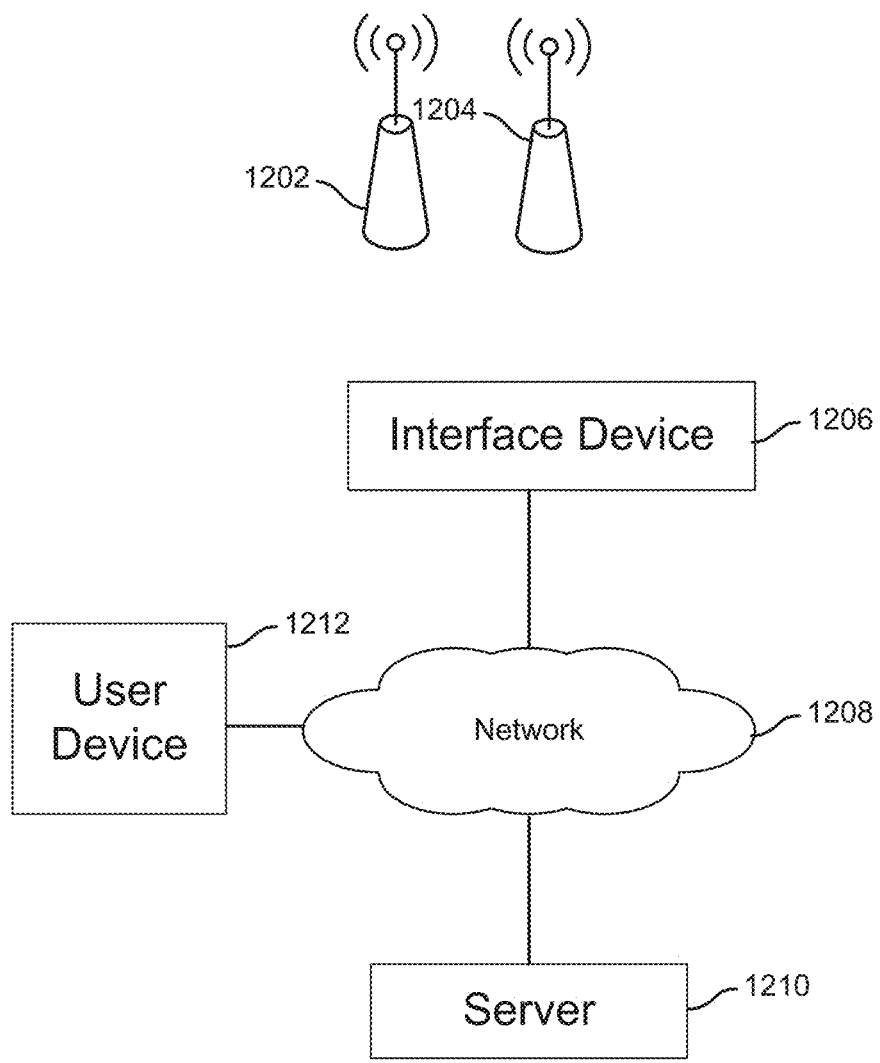
FIG. 12 is a block diagram illustrating an embodiment of a system for an automated container content management environment.

FIG. 12 is a block diagram illustrating an embodiment of a system for an automated container content management environment.

Sensor devices 1202 and 1204 each include a sensor for automatically determining the amount of content remaining in a container covered by the sensor device. In some embodiments, sensor devices 1202 and 1204 each include sensor device 100, 200, 400, 500, 600, 700, 800, 900, 1000 and/or 1100 of FIGS. 1-11B. Although only two sensor devices have been shown in FIG. 12, any number of sensor devices may exist in various embodiments. Examples of sensor devices 1202 and 1204 include a measuring cup, a bottle cap, a bottle cap with a spout, a container lid, and any other container cover configured to cover at least a portion of an opening of a container.

In some embodiments, the sensor devices utilize one or more of the following to detect remaining content amount/level of content in a container and/or a volume of flow outputted from the container: ultrasound, sonar, inductive, capacitive, IR, line, video sensors, etc.

In various embodiments, sensor device 1202 and/or sensor device 1204 includes one or more of the following features:

- a threading or another portion utilized as an inductive sensor.
- a detection of content expiration by sensing the chemical composition and nutrient value using humidity, barometry, light, pH, and/or odor sensors.
- an input mechanism to receive an identification of a classification of a food type (e.g., tequila, rum, 5% ale, etc.).
- a temperature sensor and notification mechanism to notify a user if the temperature is not optimal.
- a click wheel input mechanism based on mechanical and/or electrical components (e.g., capacitive sensor).
- a display configured to display quantity, expiration date, type of product, nutrient information, temperature, last used information, etc.
- a wireless radio to identify and connect to a wireless network (e.g., BLUETOOTH, Wi-Fi, Zigbee, Z-wave, etc.).
- an ability to detect motion using an accelerometer to allow automatic power on/off on an as needed basis to optimize power consumption (e.g., an optimal power management algorithm to store, manage, and transmit the information to minimize power usage).
- a touch sensitive screen that provides an interface for placing an order.
- impellers, flow restrictive mechanisms, or any conduit utilized in pouring content out of a container
- a mechanical fixture that allows quantity measurement while enclosed in a casing that insulates and protects the electrical system from all forms of liquids (e.g., hermetically sealed).
- a module that is corrosion resistant and can operate in temperatures from −40 F to 115 F.
- an ability to store and transmit only when the network connectivity is available.
- an ability to associate information with a unique home or establishment identity.
- a touch sensitive screen based on but not limited to a resistor or capacitive sensor.
- a mechanism which allows for one touch reordering (e.g., a screen associated with the sensor device or an independent of the sensor device as an independent screen or button).
- a sensor module, pourer, and spout could be combined into a single unit or the pourer and spout could be independent of the sensors and processor module.
- impellers, flow restrictive mechanisms, and any additional conduits that attach to the sensor device can also be attached with a sensor.
- a hollow wedge configured to be resizable to fit a neck size of a container bottle.
- an electronic or physical label to allow differentiation of different sensor devices (e.g., based on the type of product, content, brand, etc.).
- a mechanical motor or other mechanism that can be utilized to clean the sensor device (e.g., cleaned using suction or air pressure).
- a mechanical or MEMS motor which could be attached to the sensor device so as to create a suctioning of air from within the container.
- once air is evacuated from a container, an ability to seal and block oxygen from entering the bottle.
- a replaceable and/or rechargeable battery (e.g., battery may be recharged using inductive charging (e.g., Qi) and/or resonance wireless charging).

Interface device 1206 receives data from one or more sensor devices. For example, sensor device 1204 broadcasts an identifier of an amount of content remaining in a container covered by sensor device 1204 and interface device 1206 receives the identifier for storage and processing. In some embodiments, sensor devices 1202 and 1204 each need to be configured for a specific type of container to allow each sensor device to be able to more accurately measure the amount of content remaining in a container engaged by the sensor device. For example, the waveform of the ultrasonic signal emitted by a sensor of the container cover is to be specifically configured for the shape/size of the container. In some embodiments, interface device 1206 pairs with a sensor device (e.g., via a wireless personal area network connection) to transmit configuration data specific to the type of container associated with the sensor device. In some embodiments, a user utilizes interface device 1206 to specify the type of container to be associated with a specific sensor device. In some embodiments, a user utilizes interface device 1206 to view, manage, and/or configure one or more associated sensor devices. For example, a user utilizes an application of interface device 1206 to configure sensor devices, view an inventory of remaining content measured by sensor devices, and automate ordering of low inventory content. Examples of interface device 1206 include a mobile device, a smartphone, a smart watch, a wearable computer, a laptop computer, a desktop computer, and any other type of computer. In some embodiments, the interface device is also a charging station for one or more sensor devices. In some embodiments, a charging station includes a mechanism to sanitize a sensor device (e.g., via a suction cleaning, heating, blow drying, etc. mechanism).

In some embodiments, interface device 1206 (e.g., base station) acts as a central communication hub for all sensor devices of a user within a certain proximity. In some embodiments, interface device 1206 is associated with a specific user. Multiple interface devices may be utilized to manage the same set of sensor devices. For example, multiple interface devices may communicate with one another and/or with a backend server to synchronize data. In some embodiments, interface device 1206 includes BLUETOOTH, BLUETOOTH Low Energy, Zigbee, Z-wave, and/or wireless (402.x) protocol-based wireless chipsets. In some embodiments, interface device 1206 includes a display to display sensor device status, product quantity, uses, order reminders, etc. In some embodiments, interface device 1206 communicates with a Point of Sales (POS) system to correlate sales data with measured content utilization/consumption/depletion. In various embodiments, interface device 1206 (e.g., base station) includes one or more of the following:

- a display to inform a user about sensor device status, product quantity, uses, reminders, etc.
- a touch sensor or flashing LED-based communicator to pair the sensor devices.
- a data storage to store data from thousands of sensor devices for at least a few days to a month.
- an ability to communicate with a computer system.
- an ability to communicate with the cap sensor devices to collect the remaining volumes on demand.
- an ability to communicate with the cap sensor devices to re-pair itself to a new container and provide new configuration parameters.
- an ability to communicate with the sensor devices to evacuate oxygen out of the container.

Interface device 1206 is connected to server 1210 (e.g., backend server) by network 1208. In some embodiments, server 1210 remotely stores and/or processes measurement data received from sensor devices. For example, measurement data periodically broadcasted by sensor devices 1202 and 1204 is received by interface device 1206 and interface device 1206 provides the received data to server 1210 for storage and/or backend server processing. In some embodiments, interface device 1206 and/or server 1210 utilizes measurement data of a sensor device to calculate an amount of content remaining in a container engaged by the sensor device. For example, a round trip signal reflection time measured by a sensor device is utilized to calculate a percentage fill amount of content remaining in a container. In some embodiments, server 1210 processes current and/or historical content measurements to provide analytics (e.g., consumption patterns, determine inventory, analyze cost of goods, identify popularity trends, etc.) and inventory management solutions (e.g., inventory forecasting, inventory planning, automated inventory ordering, etc.). In various embodiments, server 1210 provides one or more of the following functionalities:

- a storage of product related data that offers a view into consumption patterns by service owners: product name, types of product, brand, UPC or a bar code, quantity, price, distributor, date and time of purchase, amount per use, time of use, location, expiration, chemical composition, odor, color, temperature, humidity, ingredients used, and various nutrient amounts (e.g., Sulfites, ethyl, carbohydrates, proteins, fats, sugars, etc.).
- a mechanism to uniquely associate various devices that help collect utilization data with each user and their inventory.
- an ability to listen, collect, and store millions of devices at any given point in time.
- an ability to notify the user to reorder the necessary product or automatically reorder and replenish from retailers/distributors.
- an algorithm that analyzes, learns, and predicts amount of product needed by a user and state of the item (e.g., expiration dates).
- an ability to set quantity threshold levels that trigger a notification to reorder.
- an ability to provide a notification when the product temperature is not ideal and the product needs more appropriate storage.
- an ability to provide a notification when the oxygen level in the bottles is beyond a threshold of permitted aeration levels.
- an ability to set thresholds for inventory based on category, brands, type of product, and usage cases.
- an ability to provide real time notifications when the inventory levels fall below threshold levels.

User device 1212 is utilized by a user to setup, configure, view and/or otherwise interact with one or more of the components shown in FIG. 12. For example, a user utilizes user device 1212 to setup and/or configure one or more of sensor devices 1202. In another example, a user utilizes user device 1212 to configure, view and/or interact with data and configuration managed, tracked and/or analyzed by server 1210. Examples of interface device 1206 include a mobile device, a smartphone, a smart watch, a wearable computer, a laptop computer, a desktop computer, and any other type of computer. User device 1212 is optional. For example, interface device 1206 may include a touchscreen that can be used to perform one or more functions of user device 1212. User device 1212 is connected network 1208 and may communicate with any of the other components shown in FIG. 12 via network 1208. User device 1212 may also directly communicate directly with one or more of the other components shown in FIG. 12. For example, user device 1212 may communicate directly with interface device 1206 and/or one or more of sensor devices 1202 via a wireless connection.

In some embodiments, the system shown in FIG. 12 is utilized in a home environment to automatically track and manage inventory of consumable product in product bottles. Each product bottle is capped using a sensor device that is configured to be a cap for the product bottle. In some embodiments, the sensor devices detect the quantity of liquid/gel remaining in each bottle and broadcast the detected quantity to interface device 1206. The interface device reports the received quantity information to server 1210. In some embodiments, server 1210 provides an online interface to manage container content (e.g., product) inventory. For example, a user entity may access server 1210 via an application of interface device 1206, user device 1212, and/or a webpage interface provided by server 1210 to view and manage inventory of one or more tracked products. Inventory information (e.g., including inventory remaining in open containers measured by sensor devices and full bottle inventory on hand in storage) may be updated automatically and viewed and exported in real time. The inventory of products may be classified by brands, product type, usage case, and/or popularity. In various embodiments, the system provides one or more following functions:

- a mechanism to export or import the entire inventory of products classified by brands, product type, usage case, and popularity.
- a manual or automated process/technique of marking sensor devices (physically or through software identifiers) for tracking which sensor device corresponds to each of the products listed in the tracked inventory.
- an ability to register and identify the base station for a particular user account.

In some embodiments, for a specific user account associated with one or more sensor devices, server 1210 learns the consumption pattern and preferences. In some embodiments, using interface device 1206 and/or user device 1212, a user is able to access information about consumption quantity, humidity, oxygen content, inventory, usage case/type, and recommendations associated with current inventory detected using one or more sensor devices. In some embodiments, using interface device 1206 and/or user device 1212, a user may access a marketplace to order products from various retailers and delivery services. In some embodiments, a user is notified via interface device 1206 and/or user device 1212 of a need to replenish an inventory of products and may also directly notify one or more retailers to place one or more appropriate orders. In some embodiments, interface device 1206 and/or user device 1212 provides recommendations for usage cases based on existing inventory detected using one or more sensor devices. In some embodiments, consumption data obtained across a plurality of different user entities may allow trend analysis and manufacturing forecasting across user entities.

In some embodiments, the sensor device includes a mechanism to control and limit an amount of content poured via a spout of the sensor device. In some embodiments, the sensor device includes a mechanism to evacuate oxygen out of a container and reseal the container. For example, in order to preserve the freshness of a product, the sensor device includes an electronic air pump that pumps air out of a container. In some embodiments, the sensor device includes or has more sensors to detect temperature, humidity, acidity and/or nutrient value of content included in a container. The detected sensor information may be transmitted to an interface device and/or a server (e.g., interface device 1206 and/or server 1210). In some embodiments, a user is provided a notification when a detected content temperature and/or other detected level is outside a recommended range.

One or more of the following may be included in network 1208: a direct or indirect physical communication connection, mobile communication network, Internet, intranet, Local Area Network, Wide Area Network, Storage Area Network, a wireless network, a cellular network, and any other form of connecting two or more systems, components, or storage devices together. Additional instances of any of the components shown in FIG. 12 may exist. For example, server 1210 may be a distributed server and/or may be connected to a plurality of interface devices. In another example, a plurality of interface devices may be utilized to manage and/or utilize the same or different container covers. In some embodiments, components not shown in FIG. 12 may also exist.

Figure 13:
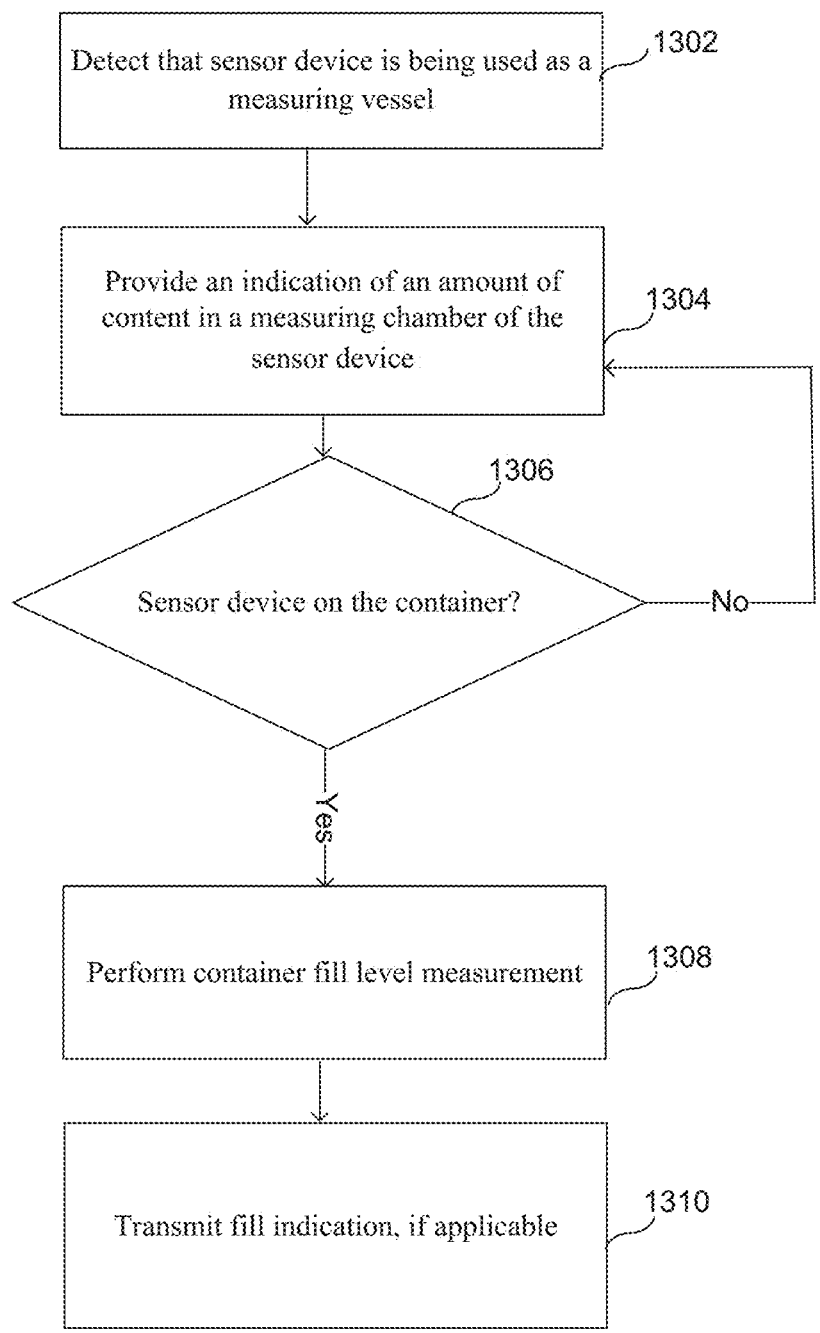
FIG. 13 is a flowchart illustrating an embodiment of a process for performing a fill level measurement using a measuring cap sensor device.

FIG. 13 is a flowchart illustrating an embodiment of a process for performing a fill level measurement using a measuring cap sensor device. The process of FIG. 4 may be at least in part implemented on sensor device 100, 200, 400, 500, 600, 700, 800, 900, 1000, 1100, 1202 and/or 1204 of FIGS. 1-12.

At 1302, it is detected that the sensor device is being used as a measuring vessel. Often electronic devices need user intervention to trigger when the device will begin to operate. This may require the user to interact with a button or other trigger and wake up the device to begin use. The wake up trigger can be detected with an action which the user would already perform through normal use of the device. For example, it may be gesture-based (e.g., by twisting or tilting the cap), wrapper-based (e.g., by hiding a sensed element in the wrapper (e.g., magnet, attached conductive element, or passive radiating element)), ambient light-based (e.g., by using a light sensor to detect when the drive is removed from the packaging), and/or based on detecting presence. In some embodiments, the sensor device includes a sensor that detects that the device has been triggered. For example, an accelerometer, gyroscope, motion, and/or orientation sensor included in the sensor device detects movement and/or orientation of the sensor device. Detected movement and/or detected orientation (e.g., cap tilted to allow opening to face up) may correspond to dispensing contents from the container associated with the sensor device (e.g., sensor device measuring cap removed from container to pour contents out of the container and into the sensor device measuring cap for dosing measurement). This may trigger a detection of an amount of content inside the measuring cap (e.g., capacitive and/or weight sensor). In some embodiments, based on a detected movement using an accelerometer of the sensor device (e.g., unscrewed from container), it detected that the sensor device is being used by a user. This detected movement can wake up the sensor device and allow the sensor device to activate one or more sensors. By trigger wakeup of the sensor device based on detected movement, limited battery power of the sensor device can be optimized by placing the sensor device in a powered down state when movement hasn't been detected for a period of time. In some embodiments, when an orientation sensor (e.g., accelerometer, gyroscope, tilt sensor, etc.) of the sensor device indicates that the sensor device has been turned upside down, it detected that the sensor device is being used as a measuring vessel. This may trigger activation of one or more sensors used in 1304.

At 1304, an indication of an amount of content in a measuring chamber of the sensor device is provided. In some embodiments, providing the indication includes electronically determining the amount of content using the capacitive sensor shown in FIGS. 9A-9B and/or weight sensors shown in FIGS. 10A-10B. In some embodiments, indication is provided via a light indicator, a speaker, a sound indicator, an audio indicator, and/or a vibration indicator. For example, the light indicator shown in FIGS. 11A-11B is utilized to provide the indication. In some embodiments, when a threshold amount of content is detected in the measuring chamber, a corresponding light is turned on and/or a color of a light is changed. Various different amounts or levels of content can be indicated by different colors, light intensities, and/or number of light pulses. For example, a green light indicates when a first threshold amount is detected and a red light indicates when a second threshold amount is detected. In some embodiments, in addition to and instead of the light indicator, a sound or haptic/vibration buzzer is utilized. For example, each buzz will indicate by a speaker, a haptic feedback component, a sound generator, a buzzer, a vibration generator, and/or an eccentric rotating mass actuator the load amount (e.g., one buzz=a first threshold content amount detected, two buzzes=a second threshold content amount detected, etc.). In some embodiments, rather than providing an active electronic indication of the amount of content in the measuring chamber, a user manually determined the amount of content using physical marking on a wall of the measuring chamber.

At 1306, it is determined whether the sensor device is coupled on the container. For example, it is determined whether the sensor device has been positioned in a corresponding orientation of a cap on the container for a threshold amount of time.

If at 1306, it is determined that the sensor device is not on the container, the process returns to 1304. If at 1306, it is determined that the sensor device is on the container, at 1308, a container fill level measurement is performed. For example, a measurement of a fill level of contents in the container is determined using the ultrasonic interrogation signal. Because it is power intensive to perform the measurement, using the triggering condition to initiate the measurement allows power to be conserved from not having to perform measurements when the triggering condition is not met. In some embodiments, the sensor device transmits an ultrasonic signal and measures the amount of time it takes for the signal to bounce off a content remaining in the container and return back to the sensor device to determine the content level remaining in the container. The sensor device includes a transceiver or a transmitter that transmits an interrogation signal and the transceiver or receiver receives the interrogation signal that has been reflected within the container. The received interrogation signal is processed to determine a distance traveled by the signal that corresponds to a fill level of the container. In some embodiments, using a pre-determined distance to volume table or curve for the container, a volume of content left in the container can be determined.

In some embodiments, prior to performing container fill level measurement, fouling of the transmitter, receiver, and/or transceiver is mitigated by opening a shutter (e.g., see FIG. 5A), actuating a wiper (e.g., see FIG. 6A), opening a hatch (e.g., see FIG. 7), blowing air (e.g., see FIG. 8A), and/or pumping out content (e.g., see FIG. 8B). In some embodiments, the transmitted signal is chosen to be of a certain frequency and power/strength/amplitude to be able to pass through content fouling and remaining on the transmitter, receiver, and/or transceiver. In some embodiments, a frequency of the transmitted signal (e.g., equal to or above 80 kHz) is selected to allow it to at least in part pass through the contents fouling the transmitter, receiver and/or transceiver. For example, a transmitter/transceiver is configured to transmit a signal with a frequency (e.g., equal to or above 80 kHz) and/or power/amplitude selected to allow the signal to at least in part pass through a content fouling and covering at least a portion of the transmitter/transceiver and be reflected back from content remaining in the container and be received though the fouling content at a receiver/transceiver. With specific selected frequencies (consequently shorter wavelength) of the transmitted signal and sufficient power (e.g., signal amplitude), the transmitted signal is able to pass through the fouling layer of the container content remaining on the signal transmitting and/or receiving component.

Sometimes the soapy liquids form bubbles. With bubbles, the reflected signal SNR is highly attenuated. One way to overcome this is to repeatedly wake up and take measurements until the signal strength of the reflected signal is of a certain strength. Besides analog signal analysis to detect the depth, digital analysis methods can be utilized to determine the depth. In some embodiments, a greatest sustaining peak algorithm is utilized. For example, the samples of the reflected signal are analyzed to find peaks that are greater than a certain threshold. The time period of sustaining peaks around the highest peaks is counted. The peak with the most sustaining peaks around it is considered as the best candidate that represents the reflected signal. In some embodiments, the digital peak has to be of a certain signal strength. The expected strength of a peak is dictated by the container and its shape. Several measurements are taken over a period of time and an average is computed from peaks that are above the threshold signal strength.

In some embodiments, if the container is wide/large (e.g., large horizontal cross-sectional area), the change in depth would be insignificant when small amounts are dispensed. In some embodiments, the amount of content in the measuring chamber determined in 1304 can be used as supplemental measurements to confirm the amount dispensed. Using this in union with the depth measurement can provide a high accuracy of what was dispensed from the container.

At 1310, a fill level indication determined based at least in part on the container fill level measurement is provided, if applicable. In various embodiments, the fill level indication is provided via a wireless digital signal to a hub, a device (e.g., mobile device), and/or directly to a server (e.g., via a Wi-Fi signal). In some embodiments, the fill level indication is provided on the sensor device (e.g., on device screen, on device light indicator, etc.). In some embodiments, the fill level indication includes a number indicating a measured distance value to content level and/or a remaining volume/quantity amount number. In some embodiments, the fill level indication includes an indication of fill category status, and/or a low fill level warning. For example, rather than providing an exact fill value number, an indication of high fill level, medium fill level, or low fill level is provided. In another example, fill level indication is only provided when the fill level is below a threshold level. For example, by only providing the fill level indictor when the fill level is low, power utilization can be conserved by reducing the number of fill level indication transmissions.

In some embodiments, the fill level indication is utilized to track and manage inventory of containers (e.g., product bottles on hand/inventory). For example, amount of remaining containers/product remaining in the container capped by the sensor device as well as unopened containers for the product remaining on hand/inventory are tracked, and when the amount/inventory reaches below a threshold, an indication/warning is provided to a user and/or the product is automatically reordered.

In some embodiments, the sensor device is shared across different containers and each container is depleted of its content product. For example, a user transfers the same sensor device to a new product container once the old product container is depleted. The fill level indication can be utilized to track the transition to the container from the old container. In some embodiments, when the sensor device detects an increase in fill level from a previously detected fill level by at least a threshold amount, it is determined that the sensor device has been moved to a new container and the old container has been depleted. In response, the current inventory is appropriately updated to reflect the depletion of the old container. In some embodiments, in addition to detection of the increase in fill level from a previously detected fill level by at least a threshold amount, one or more other factors may need to be detected to determine that the sensor device has been moved to a new container. These additional factors include a determination that a previous fill level is below (or within a range of) a first threshold (e.g., depletion threshold) value and/or a determination that a new fill level is above (or within a range of) a second threshold (e.g., new container fill threshold) value.

Figure 14:
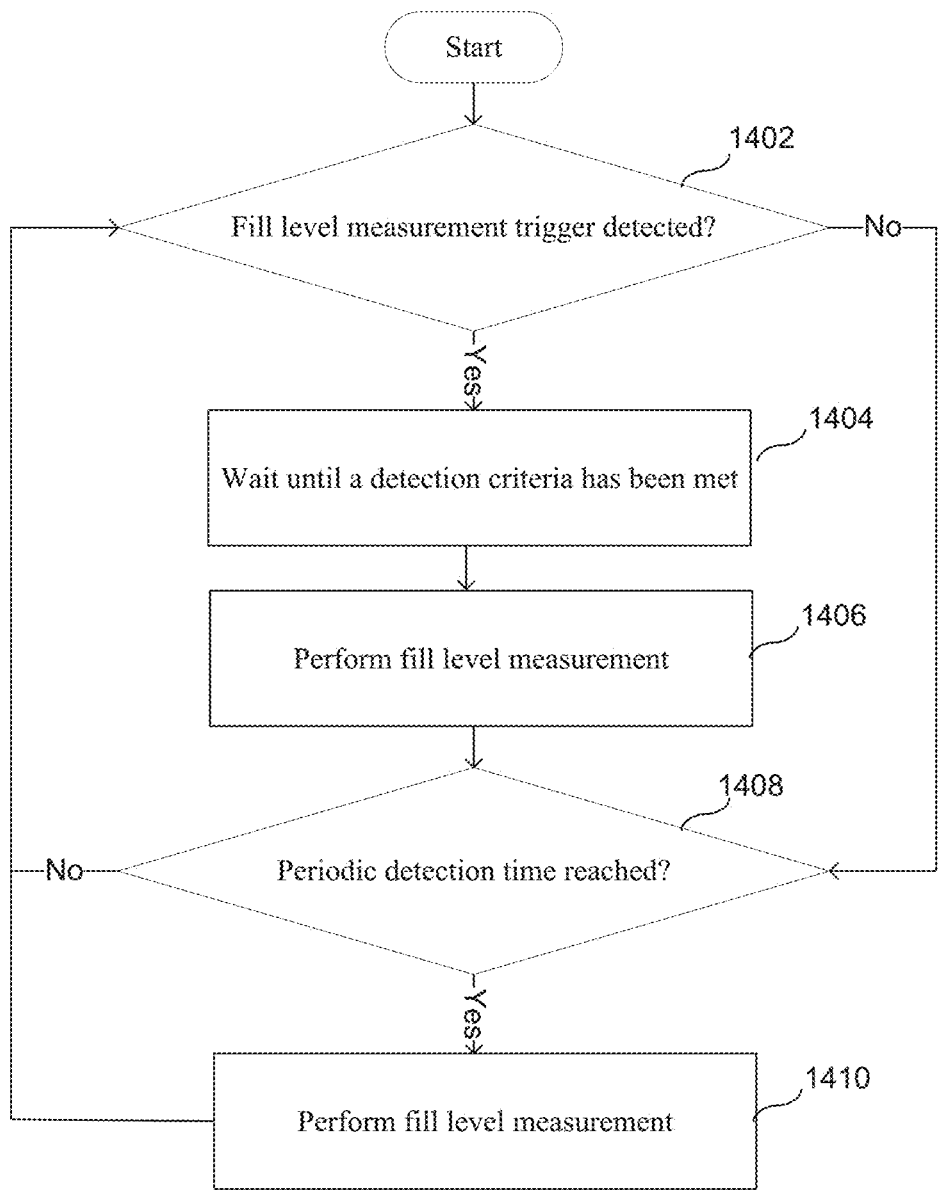
FIG. 14 is a flowchart illustrating an embodiment of a process for detecting a fill level of a container using a fill level sensor.

FIG. 14 is a flowchart illustrating an embodiment of a process for detecting a fill level of a container using a fill level sensor. The process of FIG. 10 may be implemented on sensor device 100, 200, 400, 500, 600, 700, 800, 900, 1000,

1100, 1202 and/or 1204 of FIGS. 1-12. At least a portion of the process of FIG. 14 may be performed in 1308 of FIG. 13.

At 1402, it is determined whether a fill level measurement trigger is detected. For example, an accelerometer, a motion detector, a tilt/orientation sensor, or another detector/sensor included in a fill level sensor device that detects movement and/or an orientation of the fill level sensor device detects a triggering condition to start fill level measurement. In some embodiments, data provided by an accelerometer, a motion detector, and/or a tilt/orientation sensor is received and analyzed to detect whether a detected movement meets a specified threshold to trigger a fill level measurement. In the example of a fill level sensor device that functions as a bottle cap that needs to be removed from a bottle before pouring contents out of the bottle, a fill level measurement trigger is detected when a detected z-direction (e.g., up direction) acceleration exceeds a threshold value (e.g., corresponding to removal of the bottle stopper with sufficient force/acceleration). By using the trigger to initiate the fill level measurement, the device can be placed in a low power state to conserve power while waiting for the trigger.

If at 1402 the fill level measurement trigger is not detected, the process proceeds to 1408. If at 1402 the fill level measurement trigger is detected, at 1404, the process waits until a detection criteria has been met. For example, in order to obtain an accurate measurement, a wait time is needed to ensure that the liquid content of the container has settled from the movement.

In some embodiments, the detection criteria specifies an orientation criteria. For example, before fill level measurement is to be performed, an accelerometer, gyroscope, and/or tilt/orientation sensor must indicate that the fill level sensor is in the proper orientation associated with performing an accurate fill level measurement. In one example, while a user is still tipping the sensor, the device cannot properly measure the fill level and the detection criteria has not been met. In another example, if the user has uncapped the fill level sensor from the container and lays the fill level sensor down on its side on a table, the sensor device is detected as not being in the desired upright orientation and the detected criteria has not been met.

In some embodiments, the detection criteria specifies a movement criteria. For example, before the fill level measurement is to be performed, an accelerometer, gyroscope, and/or orientation sensor must indicate that the movement/position of the fill level sensor device is relatively stable (e.g., detected movement within specified period of time is within a specified range or below a threshold). In one example, if the device is still in the process of being moved, an accurate fill level measurement cannot be achieved due to movement of contents within the container.

These detection criteria in combination may specify that in order to meet the detection criteria, the fill level sensor must be oriented upright and movement stable for at least a set period of time. In some embodiments, if the detection criteria is not met for at least an error threshold amount of time and/or an error is detected, an error/message is provided (e.g., provided to server 1210 of FIG. 12 and/or to the user) to allow a user to correct the error (e.g., user forgot to cap the container using the sensor device after pouring contents out of the container and a reminder is provided to the user after a preconfigured amount of time to put the sensor device back on the container).

At 1406, a fill level measurement is performed. For example, an interrogation signal is sent and its reflection is detected and analyzed to determined content fill level of a container engaged to the fill level sensor device. In various embodiments, at least a portion of the process of FIG. 15 is utilized to perform the fill level measurement.

At 1408, it is determined whether a periodic detection time has been reached. Rather than only relying on the fill level measurement trigger, a fill level measurement is performed periodically to ensure correct fill level detection and it is determined whether it is time to perform a periodic fill level measurement. For example, errors detecting the fill level measurement trigger and/or detecting incorrect fill levels may be corrected by periodically performing a fill level measurement. The amount of time between periodic detection may be regular intervals and/or based on dynamic factors. For example, periodic detection time is reached periodically every set amount of time (e.g., every ten minutes). In another example, periodic detection time is reached after a set amount since a previous fill level measurement (e.g., set amount of time after triggered measurement). In some embodiments, the periodic detection time is dynamically adjusted based on one or more of the following: time of day, day of week, battery power, magnitude of variances in previous measurements, sensor data, etc. In an alternative embodiment, periodic detection is optional and/or not performed. In some embodiments, once a threshold number of consecutive periodic detections have been performed and/or results in measurements that are consistent with one another, periodic detection is not performed again to conserve power until a triggering criteria is detected (e.g., detection of change in motion, acceleration, orientation, etc.). In some embodiments, periodic detection time triggering of fill level measurements is only performed during a specified time window (e.g., during business hours).

If at 1408 the periodic detection time has not been reached, the process proceeds to 1402. If at 1408 it is determined that the periodic detection time has been reached, at 1410, fill level measurement is performed. For example, an interrogation signal is sent and its reflection is detected and analyzed to determine content fill level of a container engaged to the fill level sensor device. After 1410, the process returns back to 1402. In some embodiments, the process ends after 1410 if a stopping criteria is met. In various embodiments, at least a portion of the process of FIG. 15 is utilized to perform the fill level measurement.

Figure 15:
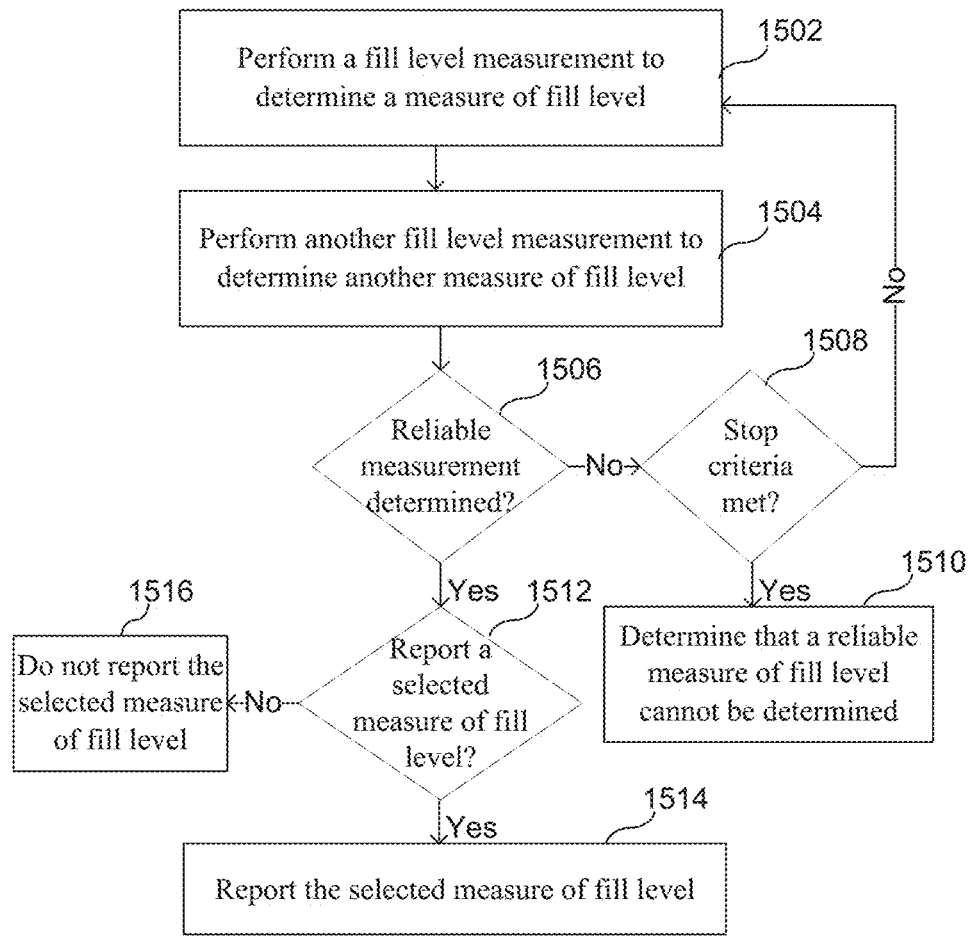
FIG. 15 is a flowchart illustrating an embodiment of a process for measuring a fill level of a container using a fill level sensor device.

FIG. 15 is a flowchart illustrating an embodiment of a process for measuring a fill level of a container using a fill level sensor device. The process of FIG. 15 may be implemented on sensor device 100, 200, 400, 500, 600, 700, 800, 900, 1000, 1100, 1202, and/or 1204 of FIGS. 1-12. In some embodiments, at least a portion of the process of FIG. 15 is included in 1406 and/or 1410 of FIG. 14.

At 1502, a fill level measurement is performed to determine a measure of fill level. In some embodiments, performing the fill level measurement includes sending an interrogation signal (e.g., sonic/ultrasonic signal) and detecting/receiving a reflection of the interrogation signal. By measuring the amount of time it takes for the interrogation signal to travel from a sensor device engaged at the top of the container to content (e.g., liquid) remaining within the container and reflect back to the sensor device, the distance traveled by the interrogation signal before being reflected (e.g., distance between sensor device 100 and the liquid surface is half of the total distance traveled by the signal as shown in FIG. 1) may be determined by multiplying the amount of time by the speed of the signal (e.g., speed of sound when the interrogation signal is an ultrasonic signal). If the total distance between the bottom of the container and the sensor device is known, the fill height of the container can be determined (e.g., total distance between bottom and sensor device minus distance between sensor device and content surface). If the shape and volume of the bottle are known, the volume/amount of content contained in the container may be determined.

The determined measure of fill level corresponds to an amount of content included in the container engaged by the fill level sensor device. For example, the measure of fill level indicates a measured distance between the sensor device and the content in the container. In some embodiments, the determined measure of fill level is determined by adjusting a measured distance between a receiver of the sensor device and the content in the container by a predetermined and/or dynamically determined adjustment distance value. For example, the adjustment distance value is added to the measured distance, and the adjustment distance value is determined based on a distance between the receiver of the sensor device and the top of the container engaged by the sensor device and/or a transmitter/receiver time delay (e.g., delay in initiating transmission and actual signal transmission, delay in a signal reaching a receiver and the receiver detecting the signal, etc.). In another example, the measure of fill level specifies a detected time it took for the sent signal to bounce back from content included in the container to the sensor device. In another example, the measure of fill level specifies the volume of content remaining in the container (e.g., absolute volume or a difference in volume from a previous measurement).

At 1504, another fill level measurement is performed to determine another measure of fill level. By performing another measurement of the fill level a time right after the previous measurement in response to the same fill level measurement trigger (e.g., trigger in 1402 of FIG. 14), the previously determined measure of fill level in 1502 is able to be verified against the new measure of fill level (e.g., the measures of the fill level should ideally be the same when measurements are performed back-to-back without any intervening fill level measurement trigger) to ensure repeatability of the fill level measurement prior to updating the content fill level of the container using the measurement data. In various other embodiments, measurements of fill level may be performed more than two times for additional verification.

At 1506, it is determined whether a reliable measure of fill level has been determined. For example, it is determined that a reliable measure of fill level has been determined in the event the last two consecutive measures of fill levels have been successfully determined (e.g., in 1502 and 1504 or two consecutive iterations of 1504) and the last two determined measures of fill levels are the same/similar (e.g., within a threshold difference value). By verifying that the last two determined measures of fill levels are the same/similar, repeatability of the measurements is verified in determining that a reliable measure of fill level has been detected.

In some embodiments, determining whether a reliable measure of fill level has been determined includes comparing the last two measurements of fill level (e.g., compare measure of fill level determined in 1502 with the measure of fill level determined in 1504 or compare two different measures of fill level determined in two consecutive iterations of 1504). For example, if a difference (e.g., value difference or percentage difference) between the measures of fill level that have been determined is within a threshold range (e.g., less than a threshold value of 3 mm) then it is determined that a reliable measure of fill level has been determined and otherwise it is determined that a reliable measure of fill level has not been determined.

If in 1506, it is determined that a reliable measure of fill level has not been determined, at 1508, it is determined whether a fill level measurement stop criteria has been met. For example, the fill level measurement is to be repeated until a consistent measure of fill level has been detected in the last two consecutive measurements or a limit on the number of times the fill level measurement is to be repeated is reached (e.g., maximum of up to five fill level measurements can be performed prior to concluding that a reliable measure of fill level cannot be determined). Thus in some embodiments, determining whether the fill level measurement stop criteria has been met includes determining whether the total number of fill level measurements performed in an attempt to determine a reliable measure of fill level (e.g., fill level measurements performed in response to the same triggering condition instance to determine a fill level corresponding to the triggering condition instance) has reached a specified limit. If the specified limit has been reached, it is determined that the fill level measurement stop criteria has been met. In some embodiments, determining whether the fill level measurement stop criteria has been met includes determining whether a stopping error has been detected during a fill level measurement. For example, certain detected errors (e.g., low battery error, sensor malfunction, sensor misalignment, sensor device position error, etc.) indicate that a reliable measure of fill level cannot be determined without user or other intervention.

If in 1508, it is determined that the fill level measurement stop criteria has not been met, the process returns to 1502 where another fill level measurement is performed to determine another measure of fill level.

If in 1508, it is determined that the fill level measurement stop criteria has been met, at 1510, it is determined that a reliable measure of fill level cannot be determined. For example, an error indication (e.g., identifying a reason of the error) is transmitted via a wireless signal to a hub or other computer device. This indication may be provided to a user to allow the user to troubleshoot or replace the sensor device.

If in 1506, it is determined that a reliable measure of fill level has been determined, at 1512, it is determined whether to report a selected measure of fill level. For example, a selected measure of fill level is reported if the selected measure of fill level is sufficiently different from a previously reported measure of fill level (e.g., difference between selected measure of fill level and a previously reported measure of fill level determined to be reliable is greater than a threshold difference value). In this example, if it is determined that the difference between the selected measure of fill level and the previously reported measure of fill level (e.g., previously determined to be reliable) is less than or equal to the threshold difference value, it is determined that a reliable measure of fill level has been determined and if it is determined that the difference between the selected measure of fill level and the previously reported measure of fill level is greater than the threshold difference value, it is determined that a reliable measure of fill level has not been determined. This allows only meaningful differences in fill levels to be reported, allowing savings in power/energy from not transmitting a value that is not sufficiently different from a previously reported measure of fill level (e.g., not report slight variation between measures of fill levels caused by detection measurement noise that does not attribute to a meaningful difference in container fill level).

The selected fill level may be the measure of fill level determined at 1502 and/or 1504. For example, the last determined measure of fill level is selected as the selected fill level. In another example, a measure of fill level among the ones determined in 1502 or in iterations of 1504 that is closest to a previously reported measure of fill level is selected. In some embodiments, the selected fill level is determined based on the measures of fill level determined in 1502 and/or one or more iterations of 1504. For example, an average of the last two measures of fill level is calculated and selected as the selected measure of fill level. Thus, the selected fill level may be chosen (e.g., last determined value, average value, etc.) among measures of fill levels that have been identified as same/similar (e.g., within a threshold difference value) in 1506.

If at 1512, it is determined to report the selected measure of fill level, at 1514, the selected measure of fill level is reported. Reporting the selected measure of fill level may include transmitting an identifier of the sensor device, a value indicating when the associated fill level measurement was performed (e.g., timestamp, instance number, etc.), and a value of the selected measure of fill level to interface device 1206 and/or server 1210 of FIG. 12.

In some embodiments, a previously reported selected measure of fill level (e.g., along with associated timestamp or instance value) is also reported (e.g., reported in a previous iteration of 1512) along with the data reported for the newly determined/selected measure of fill level.

By sending the previous reported selected measure of fill level along with the newly determined/selected measure of fill level, the recipient of the report is able to determine whether any previously reported measure of fill level was not received and obtain the previously reported measure of the fill level via the new report if the recipient happened to have not received it previously. The reported selected measure of fill level is used by the recipient to track the current fill level of the container. For example, the selected measure of fill level is provided by the fill level sensor device (e.g., along with an identifier of the fill level sensor device and associated time/iteration/instance value) to interface device 1206 that updates a server stored record of the fill level and/or content volume of the container measured by the fill level sensor device.

If at 1512, it is determined to not report the selected measure of fill level, at 1516, the selected measure of fill level is not reported. Despite not reporting the measure of fill level, other indications may be sent (e.g., indication sent to interface device 1206 of FIG. 12 that measurement was performed but not reported). In some embodiments, a heartbeat message may still be sent despite not reporting the actual measure of fill level to indicate an operational status of the sensor device.

In some embodiments, if an error is detected by the fill level sensor device during any of the steps in the process of FIG. 15, the process ends and an indication of the error is provided. For example, detected errors such as detected movement during fill level measurement, improper fill level sensor positioning/latch to container, blocked receiver/sensor (e.g., liquid beaded on sensor or receiver and is hindering the detection), etc. are indicated and the process stops to allow a user to correct the error.

Figure 16:
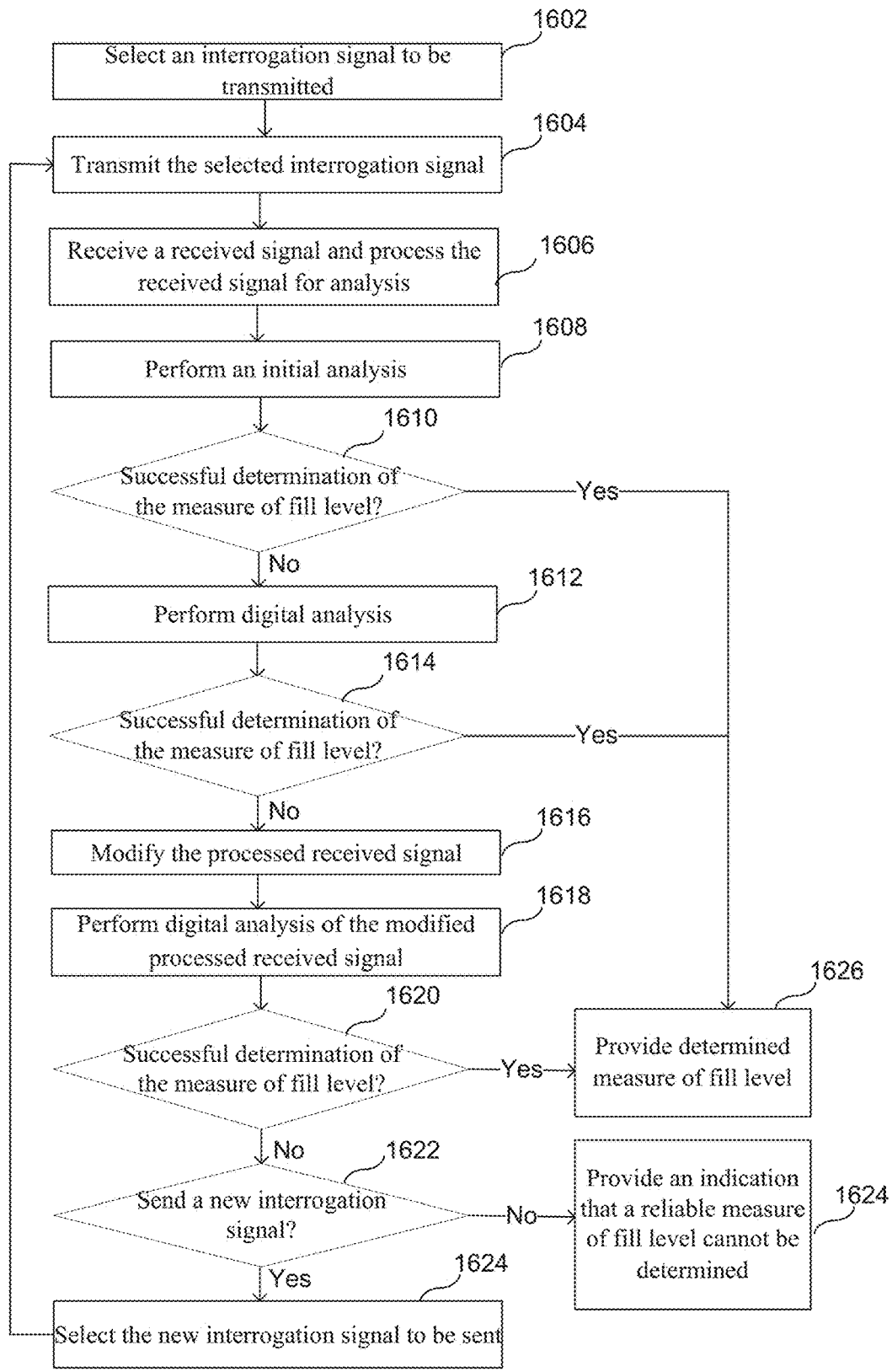
FIG. 16 is a flowchart illustrating an embodiment of a process for using a fill level sensor device to perform a fill level measurement to determine a measure of fill level of a container.

FIG. 16 is a flowchart illustrating an embodiment of a process for using a fill level sensor device to perform a fill level measurement to determine a measure of fill level of a container. The process of FIG. 16 may be implemented on sensor device 100, 200, 400, 500, 600, 700, 800, 900, 1000, 1100, 1202, and/or 1204 of FIGS. 1-12. In some embodiments, at least a portion of the process of FIG. 16 is included in 1502 and/or 1504 of FIG. 15. For example, at least a portion of the process of FIG. 16 is executed by a fill level sensor each time a fill level measurement is performed by the sensor device to determine a measure of fill level indicating an amount of content included in the container engaged by the sensor device.

At 1602, an interrogation signal to be transmitted is selected. In some embodiments, the interrogation signal to be transmitted is selected based on a received configuration. For example, a received configuration specifies a default set of configuration parameters of a default interrogation signal to be utilized to determine an initial approximate fill level. The received configuration may also specify one or more fill level range specific sets of configuration parameters that specify the specific interrogation signal to be utilized for a particular fill level. For example, for each range of fill levels, a different set of configuration parameters for a specific interrogation signal to be utilized for the particular fill level range is specified in the received configuration. In one example, once an initial approximate fill level is determined using the default set of configuration parameters, a specific set of configuration parameters corresponding to a specific fill level range that includes the initial approximate fill level is selected as the configuration parameters of the interrogation signal to be utilized to determine a more specific fill level. In some embodiments, the received configuration specifies a plurality of sets of configuration parameters and each set is utilized to generate and transmit a corresponding interrogation signal one or more times until a set that results in a consistent fill level measurement has been identified. This set of configuration parameters that resulted in the consistent fill level measurement may be utilized for subsequent measurements of different fill levels and/or this search for a consistent result producing set of configuration parameters may be performed periodically and/or each time a fill level measurement is performed. In some embodiments, the measurement fill level of the identified set is utilized to select the set of configuration parameters to be utilized to determine a more accurate fill level. For example, the set of configuration parameters for the fill level range corresponding to the measured fill level is selected.

In some embodiments, based on a previous fill level, the interrogation signal to be transmitted is identified. For example, a previously utilized interrogation signal (e.g., corresponding to a previously selected set of configuration parameters) is selected for use unless a previously determined fill level indicates that another interrogation signal (e.g., corresponding to another set of configuration parameters) should be utilized (e.g., a next fill level range interrogation signal is selected because a previously determined fill level is at the limit of or beyond the valid fill level range of the previously utilized interrogation signal).

In some embodiments, the interrogation signal is consistent across all fill levels of the container. For example, although the interrogation signal is specific to a particular type of container, the interrogation signal is consistent for all fill levels of the container. In some embodiments, the interrogation signal is an impulse. In some embodiments, the interrogation signal is an acoustic signal. In some embodiments, the interrogation signal is an ultrasonic signal. In an alternative embodiment, the selected interrogation signal is a standard default interrogation signal to be used when performing a fill level measurement.

At 1604, the selected interrogation signal is transmitted. In some embodiments, the transmitted interrogation signal is generated using a selected set of configuration parameters within the received configuration. In some embodiments, the selected interrogation signal includes one or more signal pulse components specified by the selected set of configuration parameters. For example, each signal pulse may be identical and the signal pulses are emitted sequentially with an optional period of no signal (e.g., silence) between the signal pulses.

The number of signal pulses, the length of the signal pulses, a frequency of the signal pulses, a signal content of the signal pulses, a strength/magnitude of the signal pulses, a profile of the signal pulses, a waveform of a signal pulse, a length of null signal between the signal pulses, a length/width of a signal component, a pulse width, an amplitude/intensity of the signal component, a modulation of the signal component (e.g., pulse-width modulation to be utilized), and/or a duty cycle of the signal component, etc. may be specified by the received configuration.

The variations of the interrogation signal may be due to the type of container that is holding the content to be measured and/or fill level range of the container. For example, the thickness of the container, the material of the container, a shape of the container, a length of the container, a width of the container, a size of the container, and/or an amount/type of the content included in the container may all affect how and where the interrogation signal travels and bounces within the container and the received configuration is specific to the container type and/or fill level of the container to improve the content amount/volume/level measurement of a sensor device.

In some embodiments, the interrogation signal is consistent across all fill levels of the container. In some embodiments, the interrogation signal is an impulse generated by a speaker. In some embodiments, the interrogation signal is an acoustic signal. In some embodiments, the interrogation signal is an ultrasonic signal.

In some embodiments, by measuring the amount of time it takes for the interrogation signal to travel from a sensor device engaged at the top of the container to content (e.g., liquid) remaining within the container and reflect back to the sensor device, the distance traveled by the interrogation signal before being reflected (e.g., distance between sensor device 100 and liquid surface is half of the total distance traveled by the signal as shown in FIG. 1) may be determined by multiplying the amount of time by the speed of the signal (e.g., speed of sound when the interrogation signal is an ultrasonic signal). If the total distance between the bottom of the container and the sensor device is known, the fill height of the container can be determined (e.g., total distance between bottom and sensor device minus distance between sensor device and content surface). If the shape and volume of the bottle are known, the volume/amount of content contained in the container may be determined.

At 1606, a receiver receives a received signal and the received signal is processed for analysis. For example, after the interrogation signal is transmitted, the receiver (e.g., microphone) of the sensor device starts detecting the received signal. As the interrogation signal reflects off content included in the container, the reflected signal is detected in the received signal. In some embodiments, preparing the received signal includes filtering the received signal to improve signal to noise ratio. For example, the received signal is subject to noise and the received signal is filtered to isolate the desired signal (e.g., band-pass filter the received signal), and amplified (e.g., to improve signal to noise ratio). In some embodiments, the preparing the received signal includes obtaining an envelope of the received signal. For example, using a hardware circuit (e.g., analog) and/or other (e.g., digital) signal envelope detector, an upper envelope of the received signal is obtained. Preparing the received signal includes performing an analog to digital conversion. For example, the analog signal output of an envelope detector of the received signal is converted to a digital signal for analysis by a digital signal processor. The digital signal may be stored in memory storage for subsequent analysis.

In some embodiments, a predetermined beginning portion (e.g., predetermined amount of time in the beginning of the signal) of the received signal may be modified/ignored/removed/muted due to coupling between the transmitter and receiver of the sensor device. For example, when the transmitter transmits the interrogation signal, the signal may be received by the receiver of the sensor device (e.g., conducted directly from the transmitter to the receiver via the housing of the sensor device) before the signal is reflected by the contents of the container, and this undesired signal portion received in the beginning of the received signal is not to be identified as a reflection In some embodiments, if an error is detected while performing step 1604 and/or 1606, it is determined that the measure of fill level cannot be successfully determined. For example, it is expected that the container and the fill level sensor device are not physically moved during fill level measurement (e.g., movement may disturb contents inside the container and the contents may have been moving when the measurement was performed). When an error is detected by the sensor device (e.g., using data from an accelerometer, gyroscope, orientation sensor, signal received, etc.) during the fill level measurement, it may be determined to abort the process of FIG. 16, or determine that a fill level measurement should be performed again and the process of FIG. 16 may return to 1604 to repeat interrogation signal transmission.

At 1608, an initial analysis is performed to attempt to determine a measure of fill level. For example, an initial analysis (e.g., analog analysis) is performed using an analog version of the received signal in an attempt to determine the measure of fill level using an analysis technique that takes advantage of the high signal resolution of the analog signal. Additionally, the analog analysis may utilize less resources than other more advanced digital analysis techniques that may require more resources.

In some embodiments, the initial analog analysis is utilized to identify candidate locations in the analog version of the received signal that may correspond to receipt at the receiver of a reflection of the interrogation signal. Then more advanced techniques (e.g., digital signal analysis) may be utilized to identify which of the identified candidate locations, if any, in the analog version of the received signal most likely corresponds to receipt of the reflection of the interrogation signal. If the initial analog analysis results in a single candidate location in the analog version of the received signal that corresponds to receipt of the reflection of the interrogation signal, this candidate location in the analog version of the received signal may be utilized without the need to perform the more advanced technique (e.g., digital signal analysis).

The measure of fill level corresponds to an amount of content included in the container engaged by the fill level sensor device. For example, the measure of fill level indicates a measured distance between the sensor device and the content in the container. In another example, the measure of fill level specifies a detected time it took for the sent signal to bounce back from content included in the container to the sensor device. In another example, the measure of fill level specifies the volume of content remaining in the container (e.g., absolute volume or a difference in volume from a previous measurement).

A reflection of the interrogation signal that reaches the receiver may be characterized by an increase in signal amplitude corresponding to when the reflected signal reaches the receiver. In some embodiments, using the initial analysis to determine the measure of fill level includes identifying instances (e.g., a time value of when it occurs) in the received signal (e.g., in processed received signal from 1606) when the signal strength meets a detection threshold (e.g., reflection detection threshold). For example, a reflection is identified by detecting one or more instances in the received signal where the amplitude increases to transition from being below the detection threshold to meet the threshold. The detection threshold may be dynamically set and the detection threshold may be identified in a received configuration. In some embodiments, determining the measure of fill level includes analyzing an envelope of the received signal (e.g., the processed received signal in 1606) to identify when the reflected signal reaches the receiver. For example, the envelope of the analog signal is analyzed to detect when an amplitude of the envelope of the received signal reaches a detection threshold corresponding to a detected reflection. In some embodiments, an analog envelope detector (e.g., envelope detector built analog circuit components) is included in the fill level sensor device and used to obtain the envelope of the received analog signal that is analyzed to identify when the reflected signal reaches the receiver.

The detection threshold may be dynamically varied based on a type of container that includes the content to be measured and/or a fill level of the container. For example, the shape of the container and the amount of distance that an interrogation signal has to travel to detect the fill level may influence the strength of the reflected signal that is received at the receiver of the fill level sensor and the detection threshold is adjusted and set based on one or more factors. In some embodiments, specification of the detection threshold was received. For example, based on a type of container to be associated with the fill level sensor, one or more detection thresholds specific to the particular container are provided to the fill level sensor device during fill level detection. In some embodiments, the detection threshold is at least based on a previously detected fill level of the container and a previously determined fill level and/or estimated fill level of the container is utilized to select the reflection detection threshold. For example, for different ranges of fill levels, a different detection threshold is to be utilized and the detection threshold corresponding to the last measured fill level is selected to be utilized. In various embodiments, the reflection detection threshold may be a fixed value, a relative value, a difference value, an offset value or a percentage value.

In some embodiments, it is determined whether a selected amplitude value of the signal meets the detection threshold including determining a difference between a baseline signal amplitude and the selected amplitude value and determining whether the difference meets the reflection detection threshold (e.g., the set reflection detection threshold is a relative value). For example, rather than directly using the raw magnitude value of the selected signal amplitude, a relative difference between the baseline signal amplitude and the selected amplitude value is utilized to compensate for amplitude increase caused by other signal sources (e.g., the difference better measures signal amplitude increase caused by a reflection). The baseline signal amplitude may be preconfigured, specified in a received configuration, and/or dynamically determined. For example, the baseline signal amplitude is determined by averaging signal amplitude (e.g., frequency low pass filter) of the received signal (e.g., envelope of the received signal) for a window of time (e.g., for set amount of latest signal envelope hysteresis). When comparing this difference with the reflection detection threshold (e.g., threshold selected/determined for comparison with difference values), it is determined that the selected amplitude value meets the reflection detection threshold if the difference is greater than or equal to the reflection detection threshold. Otherwise, it is determined that the reflection detection threshold is not met. In some embodiments, the selected amplitude value can only meet the reflection detection threshold if the selected amplitude value is greater than the previous selected amplitude value (e.g., only detect signal increases to threshold).

In some embodiments, once it has been determined that the selected amplitude value has met the reflection detection threshold, a next amplitude value in the signal is not eligible to meet the reflection detection threshold until the amplitude of the signal falls below (or meets) a detection reset threshold. This reduces the likelihood of detecting another potential reflection for a period of time after a potential reflection has been identified/detected. For example, although the detection threshold has been met, the amplitude of the received signal may continue to increase or remain high for the same reflection event. In order to prevent subsequent selected amplitude values of the same reflection event from being detected as a new potential reflection, once the selected amplitude value has been determined to meet the reflection detection threshold, subsequent values of the signal are not eligible to meet the reflection detection threshold until the amplitude of the signal has fallen below (or has met) the detection reset threshold.

The detection reset threshold is equal in value to the reflection detection threshold in some embodiments, while in other embodiments detection reset threshold is less in value than the reflection detection threshold. In some embodiments, the detection reset threshold is a value that is set (e.g., dynamically varied) along with the reflection detection threshold. For example, the detection reset threshold is relative (e.g., a fixed amount less, a percentage less, etc.) to the reflection detection threshold.

In some embodiments, the time value that corresponds to when the reflected signal reaches the detection threshold value (e.g., when amplitude of the received signal or envelope of the received signal reaches a corresponding threshold value) is included in the measure of fill level. For example, the determined measure of fill level includes a time duration between transmitting the interrogation signal and receiving the portion of the signal corresponding to a received reflection. In some embodiments, the measure of fill level is associated with a fill height (e.g., identifies a distance value). For example, if the total distance between the bottom of the container and the fill level sensor device is known, the fill height of the container can be determined (e.g., total distance between bottom and sensor device minus distance between sensor device and liquid surface determined by multiplying speed of the signal with half signal travel time–the amount of time between transmitting the interrogation signal and receiving the portion of the signal corresponding to a received reflection). In some embodiments, the measure of fill level includes a volume value. For example, a table/database/data structure that maps fill length/distance (e.g., distance between content/liquid surface and sensor device, etc.) to content/liquid volume of the container is utilized to determine content/liquid volume corresponding to the determined fill height/distance. Different tables/databases/data structures may exist for different types of containers and data specific to the container is received.

At 1610 it is determined whether the initial analysis resulted in a successful determination of the measure of fill level. For example, if an amplitude of the received signal (e.g., processed received signal) does not reach the threshold value of the initial analysis, it is determined that the measure of fill level has not been successfully determined.

In some cases, not only does the transmitted interrogation signal directly reflect off contents in the container, the transmitted interrogation signal may bounce off container contents at other non-direct angles as well as off walls of the container and other components of the fill level sensor device as the interrogation signal spreads out and bounces multiple times. A detected reflection may not be actually due to a reflection off contents of the container and may instead be due to an artifact of noise or detection error. In some embodiments, if multiple reflections are detected (e.g., amplitude of the received signal or envelope of the received signal crosses a corresponding threshold value multiple times in a pattern that indicates multiple detected reflections), it is determined that the measure of fill level is unable to be successfully determined only using the initial analysis.

If at 1610 it is determined that the initial analysis did not result in a successful determination of the measure of fill level, at 1612, a digital analysis of the processed received signal is performed in an attempt to determine a measure of fill level. In some embodiments, the digital analysis in 1612 is performed regardless of whether the initial analysis resulted in a determination of the measure of fill level. In alternative embodiments, the initial analysis is not performed and a result of the digital analysis is utilized to determine the measure of fill level.

The processed received signal is analyzed to identify one or more peaks in the processed received signal. An example of the processed received signal is a digital signal that has been detected by performing an analog to digital conversion of the envelope signal of the received analog signal. The processed received signal has been stored in memory/storage of the sensor device for digital analysis. The peaks in the processed received signal likely correspond to detected reflections of the interrogation signal within the container and one of the identified one or more peaks is indicative of the fill level of the container. The total amount/length of the processed received signal analyzed and eligible for peak detection may be dynamically limited based on a physical length/configuration of an associated container. For example, because the amount of distance a signal travels directly down inside the container and back is limited by the interior size length of the container, the total length of the processed received signal analyzed for peak detection is limited to correspond to the amount of round trip signal travel of time for the length inside the container plus a buffer amount. In some embodiments, identifying the peaks in the processed received signal includes identifying instances in the processed received signal (e.g., within limited signal length based on a physical length of an associated container) when the amplitude of the processed received signal is above a peak detection threshold. In some embodiments, the peak threshold is dynamically determined based on one or more parameters (e.g., minimum amplitude value, maximum amplitude value, average amplitude value, etc.) of the processed received signal. For example, the peak detection threshold=((minimum amplitude value+average amplitude value)/2+maximum amplitude value)/2.

After the amplitude of the processed received signal rises above the peak detection threshold, the amplitude may stay above the peak detection threshold for a period of time/number of samples until it falls below the peak detection threshold. Each different period of the signal when the amplitude of the processed received signal is sustained above the peak detection threshold is identified as a different peak. For example, a next peak is eligible to be detected once the signal amplitude falls below the peak detection threshold. For each of these peaks, the length of the period (e.g., amount of time or number of samples in the period of the peak), a beginning time value associated with when the amplitude increased to cross the peak detection threshold for the corresponding peak (e.g., time value corresponding to the beginning of the peak crossing the peak detection threshold, time duration from signal transmission to when the signal portion corresponding to the beginning of the peak was received, etc.), and a rate of change of the amplitude of the processed received signal at the beginning time value of the corresponding peak are determined. If the length of the period is less than a selected threshold, the peak may be deemed ineligible to be selected as corresponding to a fill level of the container because a short peak length likely corresponds to noise rather than being due to a received signal reflection from contents of the container.

One of the one or more identified and eligible peaks is selected as corresponding to a fill level of the container. The peak that corresponds to the direct reflection of the interrogation signal off contents of the container directly back to the receiver is desired to be identified because the signal travel time of this peak corresponds to the content fill level of the container. In some embodiments, selecting the selected peak includes identifying the peak associated with the greatest determined rate of change of the amplitude (e.g., when crossing the peak detection threshold at the determined beginning time value). If there is a tie among the eligible peaks for the determined rate of change, the peak associated with the longest/largest determined length of period among the tied peaks is selected. If there is a further tie among the eligible peaks for the rate of change and the length of period, the first occurring peak (e.g., earliest beginning time value) among the tied peaks is selected. In effect in various embodiments, selecting the selected peak may include determining corresponding energies associated with each of the peaks and selecting the peak with the largest energy as the selected peak.

Then, a measure of fill level is determined based on the select peak. For example, the beginning time value associated with the selected peak is utilized in determining the measure of fill level. In some embodiments, a distance value corresponding to the selected peak is determined as the measure of fill level. For example, the selected peak corresponds to when a reflection of the interrogation signal from contents of the container reaches the signal receiver and by measuring the amount of time it took to receive the selected peak corresponding to the reflection, the distance traveled by the interrogation signal to reach contents of the container (e.g., distance between sensor device and liquid surface is half of the total distance traveled by the interrogation signal) may be determined as the measure of fill level by multiplying the amount of time by the speed of the signal (e.g., speed of sound) divided by 2 (e.g., plus an adjustment factor value to account for the distance between the receiver of the sensor device and the top of the container and/or a transmitter/receiver time delay). Ultimately, the beginning time value and/or signal travel distance associated with the selected peak can be utilized to determine a volume value of content remaining in the container.

Although identified instances in the analog signal determined in 1608 may ideally correspond with detected peaks in the digital signal because they both measure attempt to detect the same reflection instances, the difference in detection thresholds and/or methods (e.g., instance in analog signal attempts to detect beginning of a reflection while peaks in digital signal also attempt to detect highest energy point of the reflection) may yield different associated time values. Also, the time value detected in the analog signal may be more accurate than the time value detected in the digital signal due to the higher resolution of the analog signal. By using the analog signal to select candidate time values corresponding to potential reflections and using the digital signal analysis to select one of the candidate time values from the analog signal (e.g., using analysis that takes into consideration corresponding total energy associated with each associated reflection peak), a more accurate reflected signal travel time and associated measure of fill level may be determined.

In some embodiments, the beginning time value associated with the selected peak is utilized to select a corresponding one of the identified instances in the analog signal determined in 1608. For example, each identified instance specifies a time in the received analog signal when the signal strength meets the detection threshold, and one of these identified instances is identified as corresponding to the fill level of the container. Selecting one of the identified instances includes determining whether any time value of the identified instances in the analog signal is the same or within a threshold range of the beginning time value associated with the selected peak and selecting the identified instance with a time value that is within the threshold range and closest to the beginning time value of the selected peak. The time value of the selected identified instance in the analog signal is then utilized in determining the measure of fill level rather than the beginning time value associated with the selected peak. In some embodiments, a distance value corresponding to this selected identified instance in the analog signal is determined as the measure of fill level. For example, the time value of the selected identified instance in the analog signal is multiplied by the speed of the signal (e.g., speed of sound) and divided by 2 (e.g., plus an adjustment factor value to account for the distance between the receiver of the sensor device and the top of the container and/or a transmitter/receiver time delay). Ultimately, the time value and/or signal travel distance associated with the selected identified instance in the analog signal can be utilized to determine a volume value of content remaining in the container. If none of the time values of the identified instances is within the threshold range of the beginning time value associated with the selected peak, it is determined that the digital analysis has not resulted in a successful determination of the measure of fill level.

At 1614 it is determined whether the digital analysis resulted in a successful determination of the measure of fill level. For example, the digital analysis does not result in a successful determination of the measure of fill level if no peaks are identified or a selected peak cannot be identified and if a selected peak has been successfully identified, it is determined that the digital analysis has resulted in a successful determination of the measure of fill level. In another example, digital analysis does not result in a successful determination of the measure of fill level if an error is during the digital analysis. In another example, digital analysis does not result in a successful determination if any identified instance in the analog signal that corresponds to the selected peak cannot be identified, and the digital analysis does result in a successful determination if an identified instance in the analog signal that corresponds to the selected peak has been identified. For example, if none of the time value of the identified instances in the analog signal is within a threshold range of the time values associated with the selected peak, it is determined that the digital analysis did not result in a successful determination of the measure of fill level.

If in 1614 it is determined that the digital analysis did not result in a successful determination of the measure of fill level, at 1616, the processed received signal is dynamically modified based on a previously reported indication of fill level.

For example, the amount/level of content that is typically removed from the container each time content is dispensed from the container is usually within a range from the previous fill level (e.g., amount of liquid content poured from a spout of the fill level measurement device is typically constant for each pour). Based on this assumption, a dynamically selected beginning portion of the processed received signal may be modified to reduce/ignore/mute the selected beginning portion of the processed received signal that corresponds to a portion of the processed received signal unlikely to include a signal peak of the interrogation signal reflection corresponding to the fill level of the container. For example, amplitude of a selected beginning portion of the received signal processed in 1606 is reduced or set to zero. The length/duration of the selected beginning portion is dynamically determined based on the previously reported indication of fill level. For example, the time value associated with the previously reported indication of fill level (e.g., time value indicating when an interrogation signal reflection of interest was detected in the received signal of the previously reported indication of fill level) is utilized as the length/duration of the selected beginning portion. In another example, the time value associated with the previously reported indication of fill level that is reduced by a buffer percentage or value is utilized as the length/duration of the selected beginning portion to allow detection of the received signal features of the previously reported indication of fill level in case the fill level has not changed. A decrease in fill level corresponds to a longer interrogation signal reflection travel distance and time that would be detected in the received signal at a time that is after the time corresponding to a previous higher fill level. Thus in some embodiments, dynamically modifying the processed received signal includes determining the time value associated with a previously reported indication of fill level, reducing the time value by a buffer amount (e.g., reduced by a predetermined percentage or predetermined length value), and reducing an amplitude of a beginning portion of the processed received signal for the length of the reduced time value.

At 1618, a digital analysis of the modified processed received signal is performed in an attempt to determine a measure of fill level. The modified processed received signal rather than the original processed received signal is analyzed to identify one or more peaks in the modified processed received signal. The remaining peaks in the modified processed received signal likely correspond to detected reflections of the interrogation signal within the container and one of the identified peaks is indicative of the fill level of the container. By modifying the received signal to remove/reduce a portion of the signal, the number of detected peaks is likely reduced as well. In some embodiments, identifying the peaks in the modified processed received signal includes identifying instances in the modified processed received signal (e.g., also limited within limited signal length based on a physical length of an associated container) when the amplitude of the modified processed received signal is above a peak detection threshold. In some embodiments, the peak threshold is dynamically determined based on one or more parameters (e.g., minimum amplitude value, maximum amplitude value, average amplitude value, etc.) of the modified processed received signal. For example, the peak detection threshold=((minimum amplitude value+average amplitude value)/2+maximum amplitude value)/2.

After the amplitude of the modified processed received signal rises above the peak detection threshold, the amplitude may stay above the peak detection threshold for a period of time/number of samples until it falls below the peak detection threshold. Each different period of the signal when the amplitude of the modified processed received signal is sustained above the peak detection threshold is identified as a different peak. For example, a next peak is eligible to be detected once the signal amplitude falls below the peak detection threshold. For each of these peaks, the length of the period (e.g., amount of time or number of samples in the period of the peak), a beginning time value associated with when the amplitude increased to cross the peak detection threshold for the corresponding peak (e.g., time value corresponding to the beginning of the peak crossing the peak detection threshold, time duration from signal transmission to when the signal portion corresponding to the beginning of the peak was received, etc.), and a rate of change of the amplitude of the modified processed received signal at the beginning time value of the corresponding peak are determined. If the length of the period is less than a selected threshold, the peak may be deemed ineligible to be selected as corresponding to a fill level of the container.

Then one of the one or more identified and eligible peaks is selected as corresponding to a fill level of the container. In some embodiments, selecting the selected peak includes identifying the peak associated with the greatest determined rate of change of the amplitude (e.g., when crossing the peak detection threshold at the determined beginning time value). If there is a tie among the eligible peaks for the determined rate of change, the peak associated with the longest/largest determined length of period among the tied peaks is selected. If there is a further tie among the eligible peaks for the rate of change and the length of period, the first occurring peak (e.g., earliest beginning time value) among the tied peaks is selected. In effect in various embodiments, selecting the selected peak may include determining corresponding energies associated with each of the peaks and selecting the peak with the largest energy as the selected peak.

Then, a measure of fill level is determined based on the selected peak. For example, the beginning time value associated with the selected peak is utilized in determining the measure of fill level. In some embodiments, a distance value corresponding to the selected peak is determined as the measure of fill level. For example, by measuring the amount of time it took to receive the selected peak, the distance traveled by the interrogation signal to reach contents of the container (e.g., distance between sensor device and content surface is half of the total distance traveled by the interrogation signal) may be determined as the measure of fill level (e.g., by multiplying the amount of time by the speed of the signal divided by 2 plus adjustment factor, if applicable). Ultimately, the beginning time value and/or signal travel distance associated with the selected peak can be utilized to determine a volume value of content remaining in the container and/or dispensed from the container.

In some embodiments, the beginning time value associated with the selected peak is utilized to select a corresponding one of the identified instances in the analog signal determined in 1608. For example, each identified instance specifies a time in the received analog signal when the signal strength meets the detection threshold and one of these identified instances is identified as corresponding to the fill level of the container. Selecting one of the identified instances includes determining whether any time value of the identified instances in the analog signal is the same or within a threshold range of the beginning time value associated with the selected peak and selecting the identified instance with a time value that is within the threshold range and closest to the beginning time value of the selected peak. The time value of the selected identified instance in the analog signal is then utilized in determining the measure of fill level rather than the beginning time value associated with the selected peak. In some embodiments, a distance value corresponding to this selected identified instance in the analog signal is determined as the measure of fill level. For example, the time value of the selected identified instance in the analog signal is multiplied by the speed of the signal (e.g., speed of sound) and divided by 2 (e.g., plus an adjustment factor value to account for the distance between the receiver of the sensor device and the top of the container and/or a transmitter/receiver time delay). Ultimately, the time value and/or signal travel distance associated with the selected identified instance in the analog signal can be utilized to determine a volume value of content remaining in the container. If none of the time values of the identified instances is within the threshold range of the beginning time value associated with the selected peak, it is determined that the digital analysis has not resulted in a successful determination of the measure of fill level.

At 1620 it is determined whether the digital analysis performed using the modified processed received signal resulted in a successful determination of the measure of fill level. For example, the digital analysis does not result in a successful determination of the measure of fill level if no peaks are identified or a selected peak cannot be identified in the modified processed received signal and if a selected peak has been successfully identified, it is determined that the digital analysis has resulted in a successful determination of the measure of fill level. In another example, digital analysis does not result in a successful determination of the measure of fill level if an error is during the digital analysis. In another example, digital analysis does not result in a successful determination if any identified instance in the analog signal that corresponds to the selected peak cannot be identified, and the digital analysis does result in a successful determination if an identified instance in the analog signal that corresponds to the selected peak has been identified. For example, if none of the time values of the identified instances in the analog signal is within a threshold range of the time value associated with the selected peak, it is determined that the digital analysis did not result in a successful determination of the measure of fill level.

If in 1620 it is determined that the digital analysis did not result in a successful determination of the measure of fill level, at 1622 it is determined whether to send a new interrogation signal. For example, the strength of the received signal corresponding to the reflection off contents of the container may be too weak to be reliably utilized to determine the measure of fill level. This may be due to liquid/condensation beading/bubbling/blocking the transmitter and preventing the full strength transmission of the interrogation signal. In order to penetrate, disturb, and/or dislodge the liquid/condensation blocking/beading/bubbling on the transmitter, a stronger interrogation signal may be utilized in the new interrogation signal to be emitted by the transmitter. The stronger interrogation signal may include increase(s) in signal length, number of pulses, and/or signal amplitude.

In some embodiments, determining whether to send a new interrogation signal includes determining the number of times an new interrogation signal has been sent in the attempt to determine the measure of fill level in an execution instance of the process of FIG. 16. This allows the interrogation signals to be tried a limited number of times (e.g., limit of one additional time for the new interrogation signal in addition to the initial interrogation signal) before concluding that the measure of fill level is unable to be determined. For example, if the number of times interrogation signals have been previously sent for the execution instance of the process of FIG. 16 exceeds a predetermined threshold number, it is determined to not send a new interrogation signal, and if the number of times interrogation signals have been previously sent for the execution instance of the process of FIG. 16 does not exceed the predetermined threshold number, it is determined to send a new interrogation signal.

In some embodiments, determining whether to send a new interrogation signal includes determining whether an amplitude (e.g., highest amplitude, average amplitude, amplitude of an identified peak, etc.) of the received signal (e.g., original received signal, processed received signal, modified processed received signal, etc.) is less than a threshold amplitude, and if the amplitude of the received signal is less than the threshold amplitude, it is determined to send a new interrogation signal and if the amplitude of the received signal is greater than or equal to the threshold amplitude, it is determined to not send a new interrogation signal. This may allow identification of a received signal that is too weak to be reliably utilized to determine the measure of fill level and dynamically send a new interrogation signal in an attempt to receive a better received signal.

If at 1622 it is determined to send a new interrogation signal, at 1624, the new interrogation signal to be sent is selected. Then the process proceeds to 1604 where the new interrogation signal selected as the selected interrogation signal is transmitted and a signal received in response is analyzed in subsequent steps. In some embodiments, a predetermined and/or dynamic amount of time is passed/waited prior to proceeding to 1604. This wait time may allow any movement of contents of the container to settle prior to performing another measurement attempt.

In some embodiments, the new interrogation signal includes a stronger transmission/signal component that is to be transmitted in order to disturb and dislodge the liquid/condensation blocking/beading/bubbling on the transmitter. The amplitude, length and number of multiple pulses of the clearing/dislodging transmission/signal are selected to be great enough in an attempt to dislodge the liquid/condensation from blocking future interrogation signals of the transmitter. In some embodiments, a clearing/dislodging transmission/signal component may function to dislodge the liquid from obstructing transmitted and a separate signal component of the new interrogation signal that is subsequently transmitted (e.g., transmitted after a pause/delay to allow the clearing/dislodging signal component to dissipate) is to be utilized in detecting its reflection for fill level measurement. In some embodiments, instead of or in addition to the clearing/dislodging transmission/signal, the strength/energy/amplitude of a portion of the new interrogation signal that is be reflected and detected for fill level determination is increased from an amplitude of the initial interrogation signal selected in 1602 to assist in the removal and/or transmission through the liquid/condensation affecting the transmitter.

In some embodiments, the new interrogation signal is another transmission instance with the same signal parameters as at least a portion of the selected interrogation signal in 1604. In some embodiments, at least a portion of the new interrogation signal includes one or more parameters of the interrogation signal selected in 1602. For example, a portion of the interrogation signal selected in 1602 may be included in a new interrogation signal or one or more signal parameters of the interrogation signal selected in 1602 are utilized as the starting basis in selecting the new interrogation signal. In some embodiments, the new interrogation signal has one or more different signal parameters as compared to the selected interrogation signal in 1604. For example, the number of signal pulses, the length of the signal pulses, a frequency of the signal pulses, a signal content of the signal pulses, a strength/magnitude of the signal pulses, a profile of the signal pulses, a waveform of a signal pulse, a length of null signal between the signal pulses, a length/width of a signal component, a pulse width, an amplitude/intensity of the signal component, a modulation of the signal component (e.g., pulse-width modulation to be utilized), and/or a duty cycle of the signal component, etc. may be different. Variations in the interrogation signals may allow different reflection patterns of the interrogation signals to be tested to ensure consistency of the measurements of fill level despite the variance in the interrogation signal.

If in 1622 it is determined to not send a new interrogation signal, at 1624, an indication is provided that a reliable measure of fill level cannot be determined. For example, this indication may be utilized to indicate an error to a user. In some embodiments, the indication is used in making a determination to perform another fill level measurement at a later time. In some embodiments, if an error is detected by the fill level sensor device during any of the steps in the process of FIG. 16, the process ends and an indication of the error is provided. For example, detected errors such as detected movement during fill level measurement, improper fill level sensor positioning/latch to container, blocked receiver/sensor (e.g., liquid beaded on sensor or receiver and is hindering the detection), etc. are indicated and the process stops to allow a user to correct the error.

If in 1610, 1614, or 1620, the measure of fill level has been successfully determined, at 1626, the determined measure of fill level is provided. For example, the determined measure of fill level is provided for use in 1502 or 1504 of FIG. 15.

Figure 17:
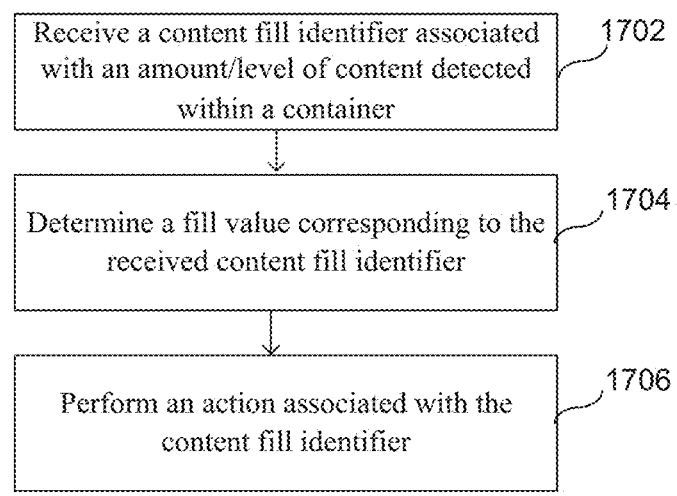
FIG. 17 is a flowchart illustrating an embodiment of a process for performing an action based on a determined content amount.

FIG. 17 is a flowchart illustrating an embodiment of a process for performing an action based on a determined content amount. The process of FIG. 17 may be at least in part implemented on interface device 1206 and/or server 1210 of FIG. 12.

At 1702, a content fill identifier associated with an amount/level of content detected within a container is received. In some embodiments, the received content fill identifier is the fill level provided in 1310 of FIG. 13, 1514 of FIG. 15 and/or 1626 in FIG. 16 (e.g., determined in 1608, 1612, or 1618 of FIG. 16). In some embodiments, the content fill identifier has been received along with an associated sensor device identifier of a specific sensor device. The content fill identifier may be utilized to track change in content amount/level of a specific container measured by a sensor device.

In some embodiments, the content fill identifier has been received via a local wireless communication protocol (e.g., Wi-Fi, BLUETOOTH Low Energy, etc.). In some embodiments, the content fill identifier is received by interface device 1206 of FIG. 12. In some embodiments, the content fill identifier is received by server 1210 via network 1208 of FIG. 12. In various embodiments, the received content fill identifier is one of a plurality of content fill identifiers received from the same sensor device over time for the same container and/or from different sensor devices for different containers. In some embodiments, the content fill identifier includes a time value associated with the amount of time it took to receive the reflected interrogation signal and/or a distance value associated with the distance traveled by the received reflected interrogation signal. Other data received along with the content fill identifier includes one or more time values (e.g., timestamp of when the content fill measurement was performed, when the content fill measurement was sent, when the content fill measurement was received, etc.), a detected temperature value (e.g., temperature measured by the sensor device), a previous measured content fill identifier (e.g., can be used in case previous measurement was not received and to verify that previous measurement was received), an identifier of the sensor device that provided the content fill identifier (e.g., media access control identifier assigned to sensor device), a power level indicator (e.g., indicating amount of battery power left in sensor device), and/or a status flag/indicator associated with the provided content fill identifier (e.g., indicating any error, message, or status associated with the provided content fill identifier).

At 1704, a fill value corresponding to the received content fill identifier is determined. For example, a percentage value and/or a volume amount value corresponding to the received content fill identifier is determined. In some embodiments, using an identifier of a sensor device associated with the received content fill identifier, a container type associated with the received content fill identifier is identified. For example, the identification of a specific container type has been previously associated with the sensor device identifier and this identification of the container type is retrieved using the sensor device identifier. In some embodiments, the sensor device identifier and the received content level identifier are provided to server 1210 by interface device 1206 and server 1210 determines the corresponding fill amount/level. In some embodiments, the received content fill identifier identifies the associated container type of the sensor device that transmitted the received content fill identifier.

In some embodiments, a specific container type is associated with a specific table/database/data structure/formula that maps an identifier of the received content fill identifier to an amount/level of content included in a container of the associated container type. For example, the fill percentage and/or volume value that corresponds to the received content fill identifier is determined. In some embodiments, the received content fill identifier is modified before being utilized to obtain the amount/level value using the specific table/database/data structure/formula for the specific container type.

At 1706, an action associated with the content fill identifier is performed. For example, the determined fill value is stored. For example, server 1210 of FIG. 12 tracks content remaining within each container being tracked using one or more sensor devices. In some embodiments, performing the action includes performing inventory management. For example, an inventory of content remaining in an opened container as well as new full containers stocked on hand are tracked to provide reporting of consumption amount, cost of products, consumption pattern, inventory forecasting, etc. In some embodiments, the determined fill value is recorded. For example, the fill value is recorded in a data structure (e.g., database) that tracks current and historical fill levels of the container of the determined fill value. Recording the determined fill value may include tracking a history of a dispensed amount of content of the container (e.g., previous fill level minus current fill level) and recording each content dispense event with associated amount and time.

In some embodiments, performing the action includes providing an alert when it is detected that inventory of the content is low. For example, a mobile application alert on an interface device is provided when the amount/level of content reaches below a threshold value for a single container and/or an inventory across all inventory on hand of the content. In another example, the alert is provided on the sensor device (e.g., flashing light). In some embodiments, the alert is only provided if the amount/level of content reaches below a threshold value. The threshold value may be dynamically determined based on a historical depletion pattern of the content. In some embodiments, an interface device application and/or a webpage is utilized to display and manage inventory of content.

In some embodiments, a database tracks remaining content in each container measured by a sensor device, and for each tracked content stores one or more of the following: sensor device identifier, type of liquid, brand of product, UPC, bar code identifier, quantity remaining, quantity utilized over a time period (e.g., minute/day/week/month/year, etc.), new product container/bottle on hand, price, distributor, date and time of purchase, servings per use, time of servings consumed, location, expiration, chemical composition, odor, color, temperature, humidity, ingredients of the content, and various content composition information (e.g., sulfites, ethyl, etc.). This may result in tracking millions of sensor devices and provided measurement data at any given point in time. In some embodiments, once sufficient fill values are collected over time, performing the action includes determining a recommended time to reorder, a rate of consumption, an average amount consumed per pour/usage, etc. In some embodiments, a user is able to establish and specify one or more inventory thresholds based on product category, brand, type of product, cost, and/or recipes. For example, when the inventory of a product falls below a threshold, a notification may be provided in real-time. Consumption and/or inventory data may be tracked per each individual user/consumer, establishment, business, distributor, account, brand, and/or geographical region.

In some embodiments, performing the action includes determining whether the latest determined fill value is larger than a previously determined fill value detected using the same sensor device. For example, it is assumed that containers are not refilled with contents and when contents of a container has been entirely consumed, a user is to replace the empty container with a new full container of the same container type and transfer the sensor device from the empty container to the new full container. The use of a new product container is automatically determined and tracked by detecting whether the latest determined fill value is larger than a previously determined fill value. In some embodiments, if a user desires to utilize a different container type with a sensor device that has been already associated with an existing container type, the user is to reconfigure the sensor device for the new container type.

In some embodiments, performing the action includes obtaining Point of Sale data of items sold and correlating the POS data with tracked content inventory depletion. This may offer a view into which types of products are in demand, how products are consumed, and pairing between different products. Based on this information, a user entity profile may be developed to enable insights into past performance and future forecasting of the user entity's sales metrics. In some embodiments, by analyzing consumption patterns across user entities, geographical regional analysis may be performed to analyze product trends. This information may be utilized to provide recommendations on items to offer for sale based on seasonality, real-time consumption data, and trends for a particular geographical area as well as across a larger region.

The combination of the POS data and the types and quantities of product sold, a view into which types of products are in demand, how is it consumed, and paired with other products offered can be analyzed and reported. Based on this information a "Profile" can be developed for a user which offers insights into how the user business is operating in terms of product consumption, ordering, and future demand. Based on the analysis of various product consumption patterns across the country, regional analysis of product consumption can be offered. Such data could then be offered to various establishments based on the geography to help them make informed choices on the product to be offered (e.g., which are in demand), which helps them maximize their revenue. In some embodiments, one or more the following functionalities are provided:

- ability to track the product consumption by content, brand, and various categorization per period (e.g., minute/day/week/month).
- ability to associate the sales of various types of other products purchased together with the product by connecting to the POS in real-time.
- ability to build a "Profile" of a home or an establishment by combining the consumption pattern with the POS data.
- ability to aggregate product consumption patterns across various geographies.
- ability to make recommendations about possible ways to maximize use by offering a certain type of product based on seasonality, consumption in real-time, and geographical trends.

In some embodiments, a utilization is recommended based on inventory availability of products (e.g., determined amount/level of content), season, consumer profile, holidays, social recommendations, etc. For example, a utilization recommendation service detects the availability of stocked products in real-time, analyzes applicable seasonal/time-based demand profiles, and compiles suggestions from consumers to recommend the best possible utilization scenarios to offer. In some embodiments, based on recommendations, inventory forecasting is adjusted to provide a recommendation of additional quantities of products/containers to order from one or more retailers. For example, when a use case is identified, the missing products and/or low inventory products are automatically ordered from the most appropriate retailers (e.g., distributors/merchants selected based on price) in quantities that have been forecasted based on detected product content depletion patterns of the user entity as well as for other user entities (e.g., similar user entities that have already offered the use case).

In some embodiments, performing the action includes assisting in ordering additional quantities of the content being tracked. For example, the consumption amount and pattern of the content and amount of full product containers on hand are analyzed to determine how many additional containers of the content should be ordered to replenish the stock inventory of the container. In some embodiments, the order for additional product containers may be automatically provided to a preferred or preset distributor/merchant/sales representative of the product container to automatically place an order for the content. For example, a user is provided an option to reorder a product from a distributor by allowing the user to automatically send inventory reports periodically to the distributor. In some embodiments, a notification to order additional quantities of a product/content is provided to a user and the user may provide an associated confirmation to automatically place an order for the recommended additional quantities of the product/content from a recommended/preset distributor. Order configuration such as distributor preference, payment information, preferred time of delivery, etc. may be stored and utilized when automatically placing an order. This may allow "one-tap" reorder, where once the reorder notification is tapped on a user interface, series of these services are initiated in the background and the desired product is delivered on time at the preferred location without any further reordering action from the user.

In some embodiments, a mobile application is utilized to provide queries for information related to the consumer. The application may then display the product availability, various notifications such as reordering, and product recommendations for the consumer. In various embodiments, the mobile application is utilized to provide one tap product reordering that helps users get the product delivered to their preferred location and preferred time without any further action. In some embodiments, the mobile application provides access to a delivery services marketplace that offers the user a choice to choose from a host of delivery services. When a user gets a notification to re-order a certain product item, the user may tap on the mobile device notification to confirm the re-order and the item would be automatically delivered to their preferred physical address from their preferred source without any further action or steps from the consumer. When the user downloads the mobile application or subscribes to the product utilization analysis and tracking services, user preferences on delivery address, payments, and preferred time of delivery may be received and stored. Various delivery service options (e.g., Amazon Fresh, Google Shopping Express, Instacart, other food marketplaces, local farmers, etc.) may be aggregated. A consumer's preference for the delivery service may be stored alongside payment, delivery location, and delivery time preferences. In some embodiments, once the reorder notification is indicated, a one or more of services are initiated in the background and the product is delivered at the time and location as specified without any further action from the consumer.

In some embodiments, a product marketplace with various distributor/merchant options for products is accessible via a device (e.g., user device 1212 and/or interface device 1206 of FIG. 12). In some embodiments, a device/server is able to locate a distributor's delivery truck or service that is nearby and automatically order/request delivery of one or more products/containers that are preferred to be restocked immediately. For example, when it is detected that additional quantity of a product is required prior to a normal product ordering/delivery schedule, immediate delivery from a nearby source is automatically requested. A user may be provided a notification prior to ordering/delivery to obtain authorization from the user.

In some embodiments, an analysis system tracks product content stocked by a user. In some embodiments, a mobile application tracks the current location of the user using the GPS locations provided by a mobile device (e.g., smartphone, tablet, wearable computer, etc.). The information of whether a certain product item is running low or about to expire and the current location of a user device are utilized to offer recommendations to pick those products when the user location is nearby a merchant that carries the products. In some embodiments, the mobile application locates a user's presence in or near a store and detects that the user is running low on a specific product and notifies the user to pick up the product while at the store.

In some embodiments, a user's social graph is obtained from social networks such as Facebook (upon obtaining permission from the user) and associated with the product persona built by the analysis system. Based on the product persona which offers insights into the consumer interests and utilization of various products, the analysis system may utilize connected friends of the network to identify product recommendations. Based on the product persona, the analysis system may mine for similar personas and recommend beneficial products, determine suggested inventory (e.g., shopping lists), suggest consumption patterns, and suggest utilization scenarios. By connecting users based on product persona, a graph of users based on product persona called a "product graph" may be determined. Such a network of consumers based on product persona may form a community to allow discussion of various product benefits. Experts may then recommend products that match certain product persona. Sensor devices can be used to track product consumption patterns and habits to compute optimal utilization per time period (e.g., minute/day/week/month). Using this information, a unique "product persona" can be developed for each user, identifying products and their impact. The "product persona" of various users can be connected together to form a "product graph." A user can provide information regarding allergies and special needs related to products and this information can be analyzed with the product utilization data collected from the content fill sensor device and notify/warn users about possible issues with certain products they have purchased, ordered, or may order.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sensor device, comprising:
   a signal transmitting component configured to transmit signals into a container engaged by the sensor device, wherein each signals' parameters are selected to allow the signals to at least in part pass through a content fouling at least a portion of the signal transmitting component;
   a processor configured to process each received reflected version of each of the transmitted signals to determine an identifier associated with an amount of content in the container engaged by the sensor device;
   a lens configured to shape the transmitted signals and wick away the content fouling to reduce fouling over a time; and
   a wireless transmitter configured to transmit the identifier associated with the amount of content in the container
   wherein the processor compares a first received reflected version of a first transmitted signal with a second reflected version of a second transmitted signal, which second transmitted signal was transmitted after the first transmitted signal, to determine if measured amount of content in the container is reliable and determine adjustments that need to be made to parameters of future signals transmitted into the container.

2. The device of claim 1, wherein the signal transmitting component is a transceiver configured to receive the reflected version of each of the transmitted signals.

3. The device of claim 1, wherein the signal transmitting component is a transmitter and the device further includes a receiver configured to receive the reflected version of each of the transmitted signals.

4. The device of claim 1, wherein the frequency of the transmitted signals is equal to or above 80 kHz.

5. The device of claim 1, further comprising a measuring chamber configured to indicate an amount of content in the measuring chamber.

6. The device of claim 5, wherein an indication of the amount of content in the measuring chamber includes a physical marker on a wall of the measuring chamber.

7. The device of claim 5, further comprising an electronic sensor configured to detect the amount of content in the measuring chamber.

8. The device of claim 7, wherein the electronic sensor includes a capacitive sensor.

9. The device of claim 7, wherein the electronic sensor includes a force, pressure, resistive or weight sensor.

10. The device of claim 5, wherein the identifier associated with the amount of content in the container is determined based at least in part on the amount of content in the measuring chamber.

11. The device of claim 5, further comprising one or more of the following: a light indicator configured to indicate a light associated with the amount of content in the measuring chamber, a sound generator configured to indicate a sound associated with the amount of content in the measuring chamber, or a vibration generator configured to indicate a vibration associated with the amount of content in the measuring chamber.

12. The device of claim 1, wherein the transmitted identifier associated with the amount of content in the container is based on a determination that the amount of content in the container is below a threshold.

13. The device of claim 1, wherein the wireless transmitter is a Wi-Fi transmitter or a personal area network transmitter.

14. The device of claim 1, wherein the identifier associated with the amount of content in the container is used to track an inventory of the content in the container.

15. The device of claim 1, wherein the identifier associated with the amount of content in the container is used to determine that the sensor device has been coupled to a new container.

16. The device of claim 1, wherein the identifier associated with the amount of content in the container triggers an automatic reordering of a product of the container.

17. The device of claim 1, wherein the container is a laundry detergent container.

18. The device of claim 1, further comprising one or more of the following: an actuated shutter, an actuated wiper, an actuated hatch, a blower, or a vacuum pump.

19. A system, comprising:
   a processor; and a communication receiver configured to receive an identifier associated with an amount of content in a container, wherein the identifier is provided by a sensor device that includes:
- a signal transmitting component configured to transmit signals into the container, wherein each signals' parameters are selected to allow the signals to at least in part pass through a content fouling at least a portion of the signal transmitting component;
- a processor configured to process each received reflected version of each of the transmitted signals to determine the identifier associated with the amount of content in the container engaged by the sensor device;
- a lens configured to shape the transmitted signals and wick away the content fouling to reduce fouling over a time; and
- a wireless transmitter configured to transmit the identifier associated with the amount of content in the container, wherein the processor compares a first received reflected version of a first transmitted signal with a second reflected version of a second transmitted signal, which second transmitted signal was transmitted after the first transmitted signal, to determine if measured amount of content in the container is reliable and determine adjustments that need to be made to at least one parameter selected from the parameters of future signals transmitted into the container.

20. A sensor device, comprising:
- a measuring chamber configured to indicate an amount of content in the measuring chamber in a first orientation of the sensor device;
- a signal transmitting component configured to transmit signals in a second orientation of the sensor device different from the first orientation of the sensor device;
- a processor configured to process each received reflected version of the transmitted signals to determine an identifier associated with an amount of content in a container engaged by the sensor device, wherein the processor compares a first received reflected version of a first transmitted signal with a second reflected version of a second transmitted signal, which second transmitted signal was transmitted after the first transmitted signal, to determine if measured amount of content in the container is reliable and determine adjustments that need to be made to at least one parameter selected from the parameters of future signals transmitted into the container; and
- a wireless transmitter configured to transmit the identifier associated with the amount of content in the container if the measured amount is reliable.

21. The device of claim 20, further comprising a lens surrounding at least a portion of the signal transmitting component for shaping transmitted signals and wicking away the content over a time.

* * * * *